US012809048B1

(12) United States Patent
Abel

(10) Patent No.: US 12,809,048 B1
(45) **Date of Patent: *Nov. 24, 2026**

(54) METHOD AND SYSTEM FOR MICROSEISMIC EVENT LOCATION ERROR ANALYSIS AND DISPLAY

(71) Applicant: Seismic Innovations, Menol Park, CA (US)

(72) Inventor: Jonathan S. Abel, Menlo Park, CA (US)

(73) Assignee: Seismic Innovations, Menlo Park, CA (US)

( * ) Notice: Subject to any disclaimer, the term of this patent is extended or adjusted under 35 U.S.C. 154(b) by 174 days.

This patent is subject to a terminal disclaimer.

(21) Appl. No.: 18/479,670

(22) Filed: Oct. 2, 2023

Related U.S. Application Data

(63) Continuation-in-part of application No. 17/158,881, filed on Jan. 26, 2021, now Pat. No. 11,774,616,
(Continued)

(51) Int. Cl.
*G01V 1/34* (2006.01)
*G01V 1/28* (2006.01)

(52) U.S. Cl.
CPC .............. *G01V 1/345* (2013.01); *G01V 1/288* (2013.01); *G01V 2210/123* (2013.01); *G01V 2210/74* (2013.01)

(58) Field of Classification Search
CPC ........... G01V 1/34; G01V 1/345; G01V 1/288
See application file for complete search history.

(56) References Cited

U.S. PATENT DOCUMENTS

| | | | | |
|---|---|---|---|---|
| 668,554 A | | 2/1901 | Bullard | |
| 2,450,707 A | * | 10/1948 | Zwickl | F25B 43/00 62/85 |

(Continued)

FOREIGN PATENT DOCUMENTS

| | | |
|---|---|---|
| EP | 1 485 733 B1 | 12/2011 |
| EP | 2 784 552 A2 | 10/2014 |

(Continued)

OTHER PUBLICATIONS

Coffin, et al., "On the Accuracy of Microseismic Event Location Estimates", undated white paper, pp. 1-18.

(Continued)

*Primary Examiner* — Abdallah Abulaban
*Assistant Examiner* — Amie M Ndure
(74) *Attorney, Agent, or Firm* — FOLEY & LARDNER LLP

(57) ABSTRACT

According certain aspects, embodiments of the invention consider the problem of microseismic event localization from a parameter estimation perspective, and include a method and system for computing and displaying characteristics of event localization errors. According to certain other aspects, embodiments of the invention include techniques for deriving aggregate statistics from a set of event location estimates, including methods for computing and displaying the probability that an event occurred in any given volume, and methods for describing and displaying the smallest volume that contains a specified percentage of the event probability or expected to contain the specified percentage of the events.

9 Claims, 21 Drawing Sheets

Related U.S. Application Data which is a continuation of application No. 14/340,356, filed on Jul. 24, 2014, now abandoned, which is a continuation-in-part of application No. PCT/US2013/022950, filed on Jan. 24, 2013, and a continuation-in-part of application No. 13/598,580, filed on Aug. 29, 2012, now Pat. No. 9,945,970.

(60) Provisional application No. 61/590,189, filed on Jan. 24, 2012, provisional application No. 61/528,730, filed on Aug. 29, 2011.

(56) References Cited

U.S. PATENT DOCUMENTS

| | | | | |
|---|---|---|---|---|
| 3,453,614 | A | 7/1969 | Bose | |
| 3,460,013 | A | 8/1969 | Gaylor | |
| 4,036,057 | A | 7/1977 | Morais | |
| 4,649,524 | A | 3/1987 | Vance | |
| 4,683,556 | A | 7/1987 | Willis | |
| 5,031,719 | A | 7/1991 | Baria et al. | |
| 5,583,825 | A | 12/1996 | Carrazzone et al. | |
| 5,747,750 | A | 5/1998 | Bailey et al. | |
| 5,774,419 | A | 6/1998 | Uhl et al. | |
| 5,917,160 | A | 6/1999 | Bailey | |
| 5,996,726 | A | 12/1999 | Sorrells et al. | |
| 6,002,063 | A | 12/1999 | Bilak et al. | |
| 6,049,508 | A | 4/2000 | Deflandre | |
| 6,462,549 | B1 | 10/2002 | Curtis et al. | |
| 6,488,116 | B2 | 12/2002 | Bailey | |
| 6,598,001 | B1 | 7/2003 | Deflandre | |
| 6,885,918 | B2 | 4/2005 | Harmon et al. | |
| 6,947,843 | B2 | 9/2005 | Fisher et al. | |
| 6,985,816 | B2 | 1/2006 | Sorrells et al. | |
| 7,026,951 | B2 | 4/2006 | Bailey et al. | |
| 7,348,894 | B2 | 3/2008 | Bailey et al. | |
| 7,391,675 | B2 | 6/2008 | Drew | |
| 7,457,195 | B2 | 11/2008 | Jones | |
| 7,486,589 | B2 | 2/2009 | Lee et al. | |
| 7,643,374 | B2 | 1/2010 | Plona et al. | |
| 7,647,183 | B2 | 1/2010 | Jechumtalova et al. | |
| 7,660,198 | B2 | 2/2010 | Arrowsmith et al. | |
| 7,660,199 | B2 | 2/2010 | Drew | |
| 8,107,317 | B2 | 1/2012 | Underhill et al. | |
| 8,649,980 | B2 | 2/2014 | Gulati | |
| 8,705,316 | B2 | 4/2014 | Thornton et al. | |
| 8,800,652 | B2 | 8/2014 | Bartko et al. | |
| 2002/0011378 | A1 | 1/2002 | Bailey | |
| 2004/0006430 | A1 | 1/2004 | Harmon et al. | |
| 2004/0008580 | A1 | 1/2004 | Fisher et al. | |
| 2004/0125696 | A1 | 7/2004 | Jones et al. | |
| 2005/0060099 | A1 | 3/2005 | Sorrells et al. | |
| 2005/0115711 | A1 | 6/2005 | Williams et al. | |
| 2005/0190649 | A1 | 9/2005 | Eisner et al. | |
| 2005/0197781 | A1 | 9/2005 | Harmon et al. | |
| 2006/0062084 | A1 | 3/2006 | Drew | |
| 2006/0081412 | A1 | 4/2006 | Wright et al. | |
| 2006/0092765 | A1 | 5/2006 | Jones | |
| 2006/0285438 | A1 | 12/2006 | Arrowsmith et al. | |
| 2007/0183260 | A1 | 8/2007 | Lee et al. | |
| 2007/0215345 | A1 | 9/2007 | Lafferty et al. | |
| 2008/0004847 | A1 | 1/2008 | Bradford | |
| 2008/0068928 | A1 | 3/2008 | Duncan et al. | |
| 2008/0106973 | A1 * | 5/2008 | Maisons | G01V 1/52 367/25 |
| 2008/0112263 | A1 | 5/2008 | Bergery | |
| 2008/0123469 | A1 | 5/2008 | Wibaux et al. | |
| 2008/0151691 | A1 | 6/2008 | Eisner et al. | |
| 2008/0159075 | A1 | 7/2008 | Underhill et al. | |
| 2008/0247269 | A1 | 10/2008 | Chen | |
| 2008/0259727 | A1 | 10/2008 | Drew | |
| 2009/0010104 | A1 | 1/2009 | Leaney | |
| 2009/0048783 | A1 | 2/2009 | Jechumtalova et al. | |
| 2009/0125240 | A1 * | 5/2009 | den Boer | G01V 1/306 702/14 |
| 2009/0168599 | A1 | 7/2009 | Suarez et al. | |
| 2009/0248312 | A1 * | 10/2009 | Hsu | G01V 1/28 702/14 |
| 2009/0259406 | A1 * | 10/2009 | Khadhraoui | G01V 1/288 702/14 |
| 2009/0296525 | A1 | 12/2009 | Eisner et al. | |
| 2010/0103774 | A1 | 4/2010 | Haldorsen et al. | |
| 2010/0157730 | A1 | 6/2010 | Bradford | |
| 2010/0238765 | A1 | 9/2010 | Grechka et al. | |
| 2010/0252268 | A1 | 10/2010 | Gu et al. | |
| 2010/0256964 | A1 | 10/2010 | Lee et al. | |
| 2010/0262372 | A1 | 10/2010 | Le Calvez et al. | |
| 2010/0262373 | A1 | 10/2010 | Khadhraoui et al. | |
| 2010/0307755 | A1 | 12/2010 | Xu et al. | |
| 2011/0091078 | A1 * | 4/2011 | Kherroubi | G01V 11/00 382/109 |
| 2011/0120702 | A1 * | 5/2011 | Craig | E21B 43/26 703/2 |
| 2012/0316789 | A1 * | 12/2012 | Suarez-Rivera | G01V 9/00 702/13 |
| 2013/0144532 | A1 * | 6/2013 | Williams | G01V 1/301 702/11 |
| 2013/0215717 | A1 | 8/2013 | Hofland et al. | |
| 2014/0112099 | A1 | 4/2014 | Hofland et al. | |
| 2014/0278120 | A1 | 9/2014 | Kahn et al. | |
| 2016/0202373 | A1 * | 7/2016 | Diller | G01V 1/288 367/56 |

FOREIGN PATENT DOCUMENTS

| | | | |
|---|---|---|---|
| GB | 2 450 707 | A | 1/2009 |
| GB | 2 525 996 | A | 11/2015 |
| WO | WO-2004/070424 | A1 | 8/2004 |
| WO | WO-2005/106533 | A2 | 11/2005 |
| WO | WO-2008/124759 | A1 | 10/2008 |
| WO | WO-2009/026979 | A1 | 3/2009 |
| WO | WO-2010/116236 | A2 | 10/2010 |
| WO | WO-2011/077223 | A2 | 6/2011 |
| WO | WO-2011/077227 | A2 | 6/2011 |
| WO | WO-2012/085848 | A1 | 6/2012 |

OTHER PUBLICATIONS

Eisner, et al., "Comparison of Surface and Borehole Locations of Induced Seismicity", Geophysical Prospecting, 2010, pp. 809-820.

Eisner, et al., "Determination of S-wave Slowness from a Linear Array of Borehole Receivers", Geophysics, vol. 176, 2008, pp. 31-39.

Eisner, et al., "Uncertainties in Passive Seismic Monitoring", The Leading Edge, Jun. 2009, pp. 648-655.

Grenchka, et al., "Data-Acquisition Design for Microseismic Monitoring", The Leading Edge, Mar. 2010, pp. 1-5.

Hur, et al., "An Analytic Model for Microseismic Event Location Estimate Accuracy", Oct. 2011, pp. 1-18.

Kidney, et al., "Impact of Distance Dependent Location Dispersion Error on Interpretation of Microseismic Event Distributions", The Leading Edge, Mar. 2010, pp. 1-5.

Maxwell, et al., "Key Criteria for a Successful Microseismic Project", SPE Paper 134695, Sep. 2010, pp. 1-16.

Maxwell, et al., "Microseismic Location Uncertainty", CSEG Recorder, Apr. 2009, pp. 41-46.

Physics Analysis Workstation. http://www2.pv.infn.it/~sc/cern/paw.pdf (Year: 1999).

Rutledge, et al., "Hydraulic Stimulation of Natural Fractures as Revealed by Induced Microearthquakes", Carthage Cotton Valley Gas Field, East Texas, Geophysics, vol. 68, No. 2, 2003, pp. 1-37.

* cited by examiner

METHOD AND SYSTEM FOR MICROSEISMIC EVENT LOCATION ERROR ANALYSIS AND DISPLAY

CROSS-REFERENCE TO RELATED APPLICATIONS

The present application is a continuation-in-part of U.S. application Ser. No. 17/158,881, filed Jan. 26, 2021, now U.S. Pat. No. 11,774,616, which is a continuation of U.S. application Ser. No. 14/340,356 filed Jul. 24, 2014, which claims priority to PCT/US2013/022950, filed Jan. 24, 2013, which claims priority to U.S. Prov. Appln. No. 61/590,189 filed Jan. 24, 2012, and which is also a continuation-in-part of U.S. application Ser. No. 13/598,580, filed Aug. 29, 2012, which claims priority to U.S. Prov. Appln. No. 61/528,730, filed Aug. 29, 2011. The contents of all of the above applications are incorporated herein by reference in their entireties.

FIELD OF THE INVENTION

The present invention relates generally to seismic monitoring and more particularly to a system and method for location error analysis and the display of information regarding microseismic events associated with a monitored volume.

BACKGROUND OF THE INVENTION

Passive localization of microseismic events is commonly used to monitor resource extraction processes such as hydraulic fracture stimulation, or "fracking," and has also been applied in monitoring other processes such as carbon sequestration and pumping of injection wells. In a typical scenario, an array of geophones is positioned in a monitor well near the well undergoing treatment. The array records seismic energy released impulsively from induced failure events as fractures form. Arrival times and polarizations of P-waves and S-waves impinging the array, among other features, are used to estimate the location of each detected event. The set of event location estimates is then used in understanding treatment results, such as total stimulated volume.

Inaccuracies in location estimates result from seismic background energy and uncertainties in seismic wave propagation, and are related to the array and fracture geometry. As described in co-pending application Ser. No. 13/598,580, which is incorporated herein by reference, localization errors remain poorly understood, and have been explored mainly through computer simulation by generating noisy travel times and polarizations (see, e.g., L. Eisner et al., "Uncertainties in passive seismic monitoring," The Leading Edge, June 2009). While some rules of thumb have been developed using this approach, they are not easily applied to real-world scenarios, and their limits of applicability are not known. Without having a known mathematical relationship between the scenario geometry and signal characteristics and the localization error, it may not be possible to determine whether a characteristic of the collection of event locations results from measurement error or is important to the interpretation of the treatment.

There are situations in which it is desired to understand the localization error behavior, its variance, e.g., for a high-quality event location estimator in the absence of a particular estimator. As an example, in designing a microseismic survey, it is desired to position the geophones so as to give good accuracy for events in locations anticipated to experience a lot of activity. As another survey design example, the cost of an additional observation well could be evaluated in light of the anticipated increase in event location accuracy it would afford. In addition, the performance of a high-quality estimator serves as a yardstick with which to gauge the performance of particular estimators, allowing the variation in estimate accuracy as a function of geometry, seismic background, and the like to be put into context. By weighing scenarios according to the achievable localization accuracy, the performance of two or more estimators can be compared.

Thus there is a need to compute aspects of microseismic localization errors, for instance, event position estimate variance and confidence intervals, for both individual events and collections of events.

When examining a set of event location estimates, the statistics of the particular estimator used are of interest. Many estimators produce positions by optimizing a goodness of fit to measured event arrival times and polarizations. The unweighted sum of square differences is commonly used to gauge goodness of fit. However, by assigning more importance to arrival times or polarizations that are measured more accurately or embody more geometric leverage, a more accurate position estimate can be determined. In this way, knowing the measurement accuracy as a function of an error weighting would allow the weighting to be optimized.

Accordingly, there is a need to characterize microseismic localization errors of least-squares estimators as a function of the weighting used.

Treatment of a well may result in hundreds or thousands of localized events, and understanding the statistics of those event positions is important to the interpretation of the microseismic survey, and, in particular, to the measurement of the total stimulated volume. In the current art, the total stimulated volume is estimated to be the convex hull of a set of estimated event positions. A difficulty with this approach has to do with the handling of estimated locations that appear to be outliers and the choice of the subset of localized events that is to define this convex hull: the stimulated volume estimate should be extended to include positions of accurately localized outlying events, but should not be extended in the case of poorly localized outlying events.

Thus, there is a need to compute aggregate statistics characterizing a collection of microseismic event positions. There is also a need to compute the stimulated volume in a way that accounts for the accuracy of the underlying event position estimates.

In the current art, event location estimates are displayed as spheres, centered on the estimated locations. Conventionally, the spheres are sized to indicate event energy. In this way, more energetic events are plotted as large spheres, whereas weak events are plotted as small spheres. One problem with this approach is that the greater the event energy, the more accurately the event may be localized—it has greater amplitude, and its features more visible above the seismic background. As a result, it is misleading to plot energetic events with markers that span larger volumes. In addition, the event spheres are opaque, and it is not possible to understand the density of events within a given volume if there are more than a few events present.

A set of microseismic events is often interpreted with other data, for instance, a seismic incoherence volume, which is thought to indicate those locations likely to fracture. Presently, the microseismic locations are displayed as dots or sized spheres, with the additional data forming a background. One issue that arises is how to correlate the discrete locations of the events with the continuous data, especially if the event positions are known with varying accuracy.

Therefore, there is a need to display microseismic events in a manner that conveys volume of likely event positions and reveals those regions likely to contain significant activity. Similarly, there is a need to display features of a set of events, such as stimulated volume estimates. Finally, there is a need to produce and display event collection statistics, such as event probability, that are continuous functions of the volume under consideration.

SUMMARY OF THE INVENTION

According to certain aspects, embodiments of the invention consider the problem of microseismic event localization from a parameter estimation perspective, and include a method and system for computing and displaying characteristics of event localization errors. The information inequality, often referred to as the Cramer-Rao Bound (CRB), is used to gauge the small-error region mean square error of event position estimates in the absence of a particular estimator for applications including survey design, and assessment and comparison of the performance of specific event location estimators. In embodiments, the small-error region performance of event position estimates found by minimizing square differences between measured and hypothesized arrival times and polarizations is derived, including methods for computing event position confidence intervals. Additional embodiments of the invention include methods for approximating the least-squares event position estimate probability density function, which is valid beyond the small-error region. Further embodiments of the invention include schemes for weighting arrival time and polarization measurements so as to produce accurate event location estimates.

According to certain other aspects, embodiments of the invention include techniques for deriving aggregate statistics from a set of event location estimates, including a method for computing the probability that an event occurred in any given volume, and another for describing the smallest volume that contains a specified percentage of the event probability or expected to contain the specified percentage of the events. These aggregate statistics may be used to estimate total stimulated volume, as well as to evaluate the plausibility of hypothesized fracture networks.

While collections of events are typically displayed as spheres arranged in the treatment volume and sized according to event magnitude, the event position estimate variances according to embodiments of the invention allow the events to be displayed as a set of error ellipses, each with a size and transparency set according to its position variance. Finally, the aggregate statistics may also be displayed in any number of dimensions, for instance by varying transparency or as boundaries at prescribed probabilities or confidences. All such displays can be overlaid on or with other features, such as seismic incoherence, to aid interpretation.

In accordance with these and other aspects, one object of the present invention to provide a method and system for computing microseismic event position estimate variances, confidence intervals and probability densities for individual event location estimates based on assumed or measured signal, seismic background and noise properties, observation and treatment well geometry, and/or arrival time and polarization estimate properties.

Another object of the present invention to provide a method and system for computing aggregate statistics of a collection of microseismic event location estimates, e.g., as a "probability volume," describing the probability of occurrence of an event at locations within a given volume, or "confidence volume," describing the smallest volume containing a specified percentage of the event position probability.

Yet another object of the present invention is to provide a method and system to display microseismic event and event collection error analysis results, including total stimulated volume (TSV) estimates. In particular, it is an object of the present invention to display error analysis results in a manner that conveys volume of likely event positions and reveals those regions likely to contain significant activity.

In furtherance of these and other objects, in one embodiment of the invention, aspects of microseismic event localization errors, including position estimate variance and position estimate confidence intervals, are computed or displayed.

In another embodiment of the invention, optimal weightings are derived for use with least-squares and semblance-based event localization methods.

In another embodiment of the present invention, a probability density function for each of one or more microseismic event position estimates is computed, and in yet another embodiment, this probability density function is used to form event probability as a function of position for a collection of events.

In another embodiment of the invention, the volume is divided into voxels, each voxel being preferably no larger than the smallest event localization standard deviation, and the probability volume, describing the probability of occurrence of an event as a function of voxel position within the volume, is generated. In still another embodiment, the confidence volume, describing the smallest volume containing a specified percentage of the event position probability, is formed.

In another embodiment of the invention, position estimates are plotted as points, with the shade, color or transparency indicating localization accuracy and/or energy. For instance, on a white background, more accurately localized events could be plotted using darker colors.

In another embodiment, events are displayed as shapes centered on their estimated positions, each sized according to the accuracy with which its position is estimated. In this way, poorly localized events would occupy larger regions about their respective estimated positions, while accurately localized events would occupy correspondingly smaller regions. In a preferred embodiment, ellipses (or ellipsoids) corresponding to event confidence intervals are used, and are made transparent and/or are colored according to their position variance.

This could be done for instance by, for each event, drawing a semi-transparent ellipsoid, centered on the estimated location and sized according to the estimate standard deviation. The transparency of the ellipsoid would be inversely related to its volume: the smaller the ellipse the less transparent it would be.

The transparencies could be nonlinearly combined such that a number of nearby inaccurately localized events could produce a relatively small opaque region. Furthermore, erosion and dilation operations could be applied to bridge small gaps in the estimated fracture structure resulting from undetected events, and the like.

In another embodiment, a region in space is divided into voxels, each preferably no larger than the greatest event localization accuracy, and the probability that each voxel in the region contains an event, the probability volume, is computed. Each voxel is then displayed using characteristics (e.g., color, intensity, transparency) that reflect the computed probability. In this way, an estimate with high variance will slightly darken a range of voxels in the region, whereas an accurately localized event will noticeably darken just a few voxels. In another embodiment, the intermediate step of computing the probability volume is skipped, and each event is in turn used to modify the properties of a set of voxels in the neighborhood of the estimated event location. In a preferred embodiment, the region would be an ellipsoid, sized according to the estimate variance, and the modification each event would affect would be a nonlinear decrease in the transparency according to the estimate variance.

In another embodiment, a confidence volume is displayed as the volume defined by a specified fraction, and in another embodiment, multiple contours are drawn for a set of confidence fractions, and each made transparent, with the smallest volumes being the least transparent.

In yet another embodiment, the probability volume or confidence volume is used as a background on which to plot one or more collections of events as points, perhaps using different colors to distinguish the different collections, for the purpose of comparing localization methods or for understanding aspects of the fracture network or total stimulated volume.

In yet another embodiment, erosion and dilation operations would be applied to the probability volume or confidence volume to bridge small gaps in the estimated fracture structure resulting from undetected events, and the like.

BRIEF DESCRIPTION OF THE DRAWINGS

These and other aspects and features of the present invention will become apparent to those ordinarily skilled in the art upon review of the following description of specific embodiments of the invention in conjunction with the accompanying figures, wherein.

DETAILED DESCRIPTION OF THE PREFERRED EMBODIMENTS

Figure 1:
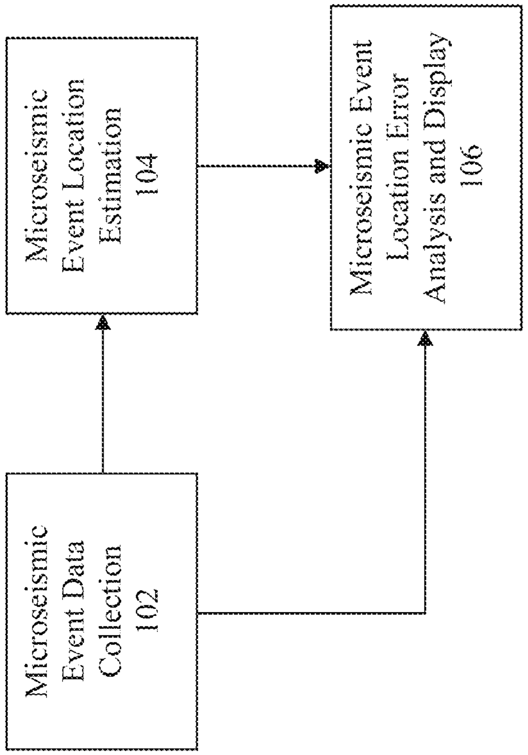
FIG. 1 is a block diagram illustrating an example system in which aspects of embodiments of the invention can be implemented.

The present invention will now be described in detail with reference to the drawings, which are provided as illustrative examples of the invention so as to enable those skilled in the art to practice the invention. Notably, the figures and examples below are not meant to limit the scope of the present invention to a single embodiment, but other embodiments are possible by way of interchange of some or all of the described or illustrated elements. Moreover, where certain elements of the present invention can be partially or fully implemented using known components, only those portions of such known components that are necessary for an understanding of the present invention will be described, and detailed descriptions of other portions of such known components will be omitted so as not to obscure the invention. Embodiments described as being implemented in software should not be limited thereto, but can include embodiments implemented in hardware, or combinations of software and hardware, and vice-versa, as will be apparent to those skilled in the art, unless otherwise specified herein. In the present specification, an embodiment showing a singular component should not be considered limiting; rather, the invention is intended to encompass other embodiments, including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

According to certain general aspects, embodiments of the invention view the problem of microseismic localization as a point parameter estimation problem, wherein the observations (the recorded geophone signals) are modeled as being drawn from a probability density function, parameterized in part by a deterministic, but unknown, source position. By doing so, the information inequality, often referred to as the Cramer-Rao Bound, may be used to place a lower bound on the variance of any unbiased source position estimator. In addition, under conditions generally satisfied in estimating the position of microseismic events (i.e., when the source position can be accurately estimated), the maximum likelihood estimator will be unbiased and achieve the bound variance. Furthermore, such maximum likelihood event position estimates will have a roughly Gaussian probability density.

As a result, the information inequality bound variance can serve as a yardstick with which to gauge and compare estimator accuracy. Additionally, the bound variance defines maximum likelihood position estimate confidence intervals via a family of concentric ellipsoids in the position variables about the event location estimate.

The maximum likelihood estimator may be written as a weighted least-squares optimization operating on intermediate variables including event arrival times and polarizations. By doing so, event position estimate variances and probability density functions are available for least-squares event position estimators which are unweighted or otherwise have weightings that are different than that of the maximum likelihood estimator. Also, the optimal weighting to use with least-squares estimators is available.

Having the individual event probability density functions allows computation of statistics of collections of events, including the computation of the probability any given volume in the space contains an event or the smallest volume containing a given percentage of the event probability.

Understanding the event position estimate statistics also leads to methods for displaying microseismic events which avoid the drawbacks of drawing spheres at event locations that are sized according to event magnitude or other indicator of event energy. Error ellipsoids (e.g., ellipses in three dimensions) may be drawn about estimated event positions, with the ellipsoids sized, oriented, and made transparent according to the localization accuracy of the corresponding event. Finally, statistics over volumes, such as the probability volume or confidence volume, can be displayed along with the individual event positions or other information such as seismic incoherence.

FIG. 1 is a block diagram illustrating an example system 100 in which aspects of embodiments of the invention can be implemented.

As shown, system 100 includes a microseismic event data collection sub-system 102. In embodiments, sub-system 102 obtains data for a volume (i.e. reservoir) being surveyed/monitored for microseismic events from sensors such as geophones such as Geospace DDS-150 three-axis "Slimhole Borehole Seismic Receiver Array" geophones using a recording device such as a digital computer such as a Geospace GeoRes recording system. It should be noted that the invention is not limited to any particular type of sensor or recording system, but that any type of sensor or recording system collecting microseismic event data can be used.

In one non-limiting example, an entire set of geophones used to survey a particular site is coupled to a common collection and recording device via wired or wireless connections, the data from all the geophones is recorded over time, and the recorded data for a given period of time, such as the duration of the hydraulic fracture treatment for a single well or single stage or zone of a well treatment, is used for further analysis by sub-systems 104 and/or 106.

In addition to sensor data representing microseismic events, the data from sub-system 102 preferably also includes geographic and geological information about the volume being surveyed, including properties of the earth medium contained in the volume such as layer boundary locations, the locations of any faults present, wave propagation velocities, rock densities, and the like, the three-dimensional locations of the sensors from which the microseismic data is collected, the three-dimensional locations and configuration of any wells such as observation wells in which the sensors are located, treatment wells, and the like, and information regarding any reservoir treatments and/or stimuli applied to the reservoir that trigger and/or may be related to microseismic events including the locations and timings of any triggered shots or explosions of known location such as "perforation" or "check" shots, and the timing and values of treatment parameters such as pump pressures and rates, and pumped fluid properties such as proppant or chemical concentrations.

Microseismic event location estimation sub-system 104 receives the data from sub-system 102 and produces estimates of microseismic events, along with their locations within the volume, by performing analyses of the data. In sub-system 104, any number of known or proprietary techniques can be used to derive such location estimates.

More particularly, seismic data collected by sub-system 102 is typically from three-axis sensors for downhole array locations, recording (x,y,z) velocities or a rotation thereof, and one-axis vertical velocity sensors for surface arrays. The sensors record earth motion over time, and the resulting recordings are processed to extract information such as the source location of events that generate transient bursts of seismic energy that arrive at the sensor array. Often in detecting the presence of microseismic events and estimating their location (as would occur in sub-system 104), the raw seismic data is processed to first detect and analyze P-waves and/or S-waves associated with a candidate event. The analysis produces arrival times and/or polarizations (directions of particle motion) that will lead to a location estimate. In other approaches, such as semblance or other correlation based methods, the information encapsulated by P-wave and/or S-wave arrival times and/or polarizations is utilized through a process operating directly on the seismic data waveforms that results in a location estimate without first analyzing particular arrival times or polarizations. It can be shown that under certain conditions these two approaches yield equivalent results.

Figure 2:
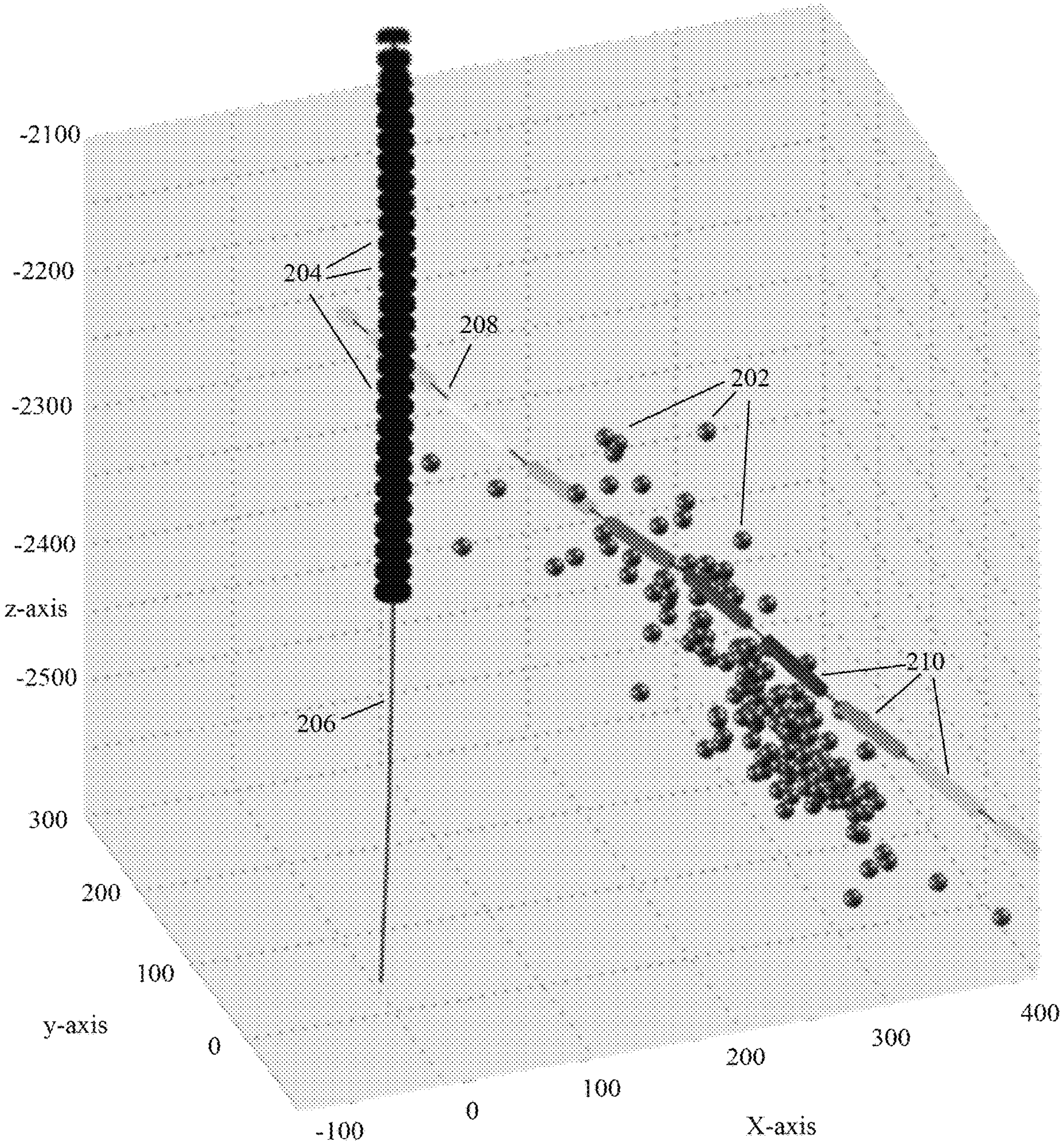
FIG. 2 is an example display of microseismic event location estimates using P-wave information only.

An example of the estimates that can be provided by sub-system 104 is shown in FIG. 2. As shown in FIG. 2, the three-dimensional location estimates 202 derived from data provided by sub-system 102 are displayed as simple darkened spheres, each having the same size and color. FIG. 2 also shows the three-dimensional location of an observation well 206, along with the locations of sensors 204 positioned therein. FIG. 2 also shows the three-dimensional location of a treatment well 208, with further graphical indications of separate treatment stages 210.

The microseismic event location estimates shown in FIG. 2 were produced by an embodiment of sub-system 104 that analyzed only the P-wave arrivals of microseismic event energy that were observed in data collected from a reservoir over a certain period of time, including both P-wave arrival times and arrival polarizations. The microseismic event location estimates shown in FIG. 3 were produced from the same set of data but using an embodiment of sub-system 104 that analyzed both P-wave and S-wave arrivals of microseismic event energy. It should be noted that a significant difference exists between the location estimates 202 in FIGS. 2 and 302 in FIG. 3, despite both sets of estimates being generated from the same raw geophone data and industry-standard processes being used to produce both sets of results. This difference illustrates the need to understand the uncertainties associated with each set of location estimates, as both results are intended to reveal the same underlying truth but provide such different pictures that reliable interpretation of the results is not possible without additional information.

Microseismic event location error analysis and display sub-system 106 performs analyses and displays according to embodiments of the invention that will be described in more detail below. The dual input paths from sub-system 102 and sub-system 104 are intended to illustrate different possible embodiments of the invention that are not necessarily mutually exclusive. For example, in some embodiments, sub-system 104 is not included in system 100 or results therefrom are not used at all by sub-system 106. In other embodiments, location or other parameter estimates from sub-system 104 are received, and sub-system 106 performs additional processing on these estimates and/or the underlying data from sub-system 102. In still further embodiments, both sub-systems 104 and 106 are included, and results therefrom are both independently produced and/or displayed.

According to aspects of the invention, and in contrast to sub-system 104, the present inventors recognize that, depending on the level of seismic background energy corrupting the recorded traces, the scenario geometry, and local propagation conditions, the location estimate will have an associated position estimate variance that can be mathematically determined. As described in more detail below, embodiments of the invention provide methods to compute the position variance, both in the form of a lower bound on variance, applicable to any estimator, and in the form of a variance for particular least-squares estimates of position. We then describe mechanisms for displaying these variances, for instance as error ellipsoids, as well as combining collections of positions and variances to form and display aggregate localization statistics.

In embodiments, each of sub-systems 102, 104 and 106 is implemented by one or more computer systems including processors, input/output devices, data communication systems (e.g. Ethernet, Wi-Fi, etc.), program and data memories (e.g. RAM, ROM, magnetic or optical data storage media, etc.) having stored thereon operating systems (e.g. Windows, Apple, Android, etc.) and application programs. Such computer systems can include any known or future systems such as desktop and notebook computers, embedded computer systems, pad computers, handheld and other portable computer devices such as iPads, iPhones, etc. In some embodiments, system 100 can integrate two or more of sub-systems 102, 104 and 106 or functions thereof in a single common computer system. For example, data from sensors and/or the reservoir being monitored may be directly communicated to a computer system implementing one or both of sub-systems 104 and 106. In other embodiments, each of sub-systems 102, 104 and 106 are implemented by separate computer systems, and any variety of known methods for transferring data therebetween can be used.

According to embodiments of the invention, sub-system 106 preferably further includes graphics devices and/or software or similar functionality for generating displays. Such displays can be in video or printed form. Those skilled in the art will understand how to adapt conventional display functionality for generating displays according to embodiments of the invention after being taught by the present examples.

1. Event Location Estimate Accuracy and Improved Localization Methods

As set forth above, according to certain aspects to now be described in more detail below, the problem of microseismic event localization is considered from a parameter estimation perspective, and associated embodiments of the invention include a method and system for computing and displaying characteristics of event localization errors. The information inequality, often referred to as the Cramer-Rao Bound (CRB), is used to gauge the small-error region mean square error of event position estimates in the absence of a particular estimator for applications including survey design, and assessing and comparing the performance of specific event location estimators. The small-error region performance of event position estimates found by minimizing square differences between measured and hypothesized arrival times and polarizations is presented, and methods for computing event position confidence intervals are described. Additionally, expressions approximating the least-squares event position estimate probability density function, valid beyond the small-error region, are derived. Furthermore, schemes for weighting arrival time and polarization measurements so as to produce accurate event location estimates are described.

We begin by describing array geometry notation and an exemplary signal model of the type that may be used in various embodiments of the presently disclosed invention. In this example, we will assume a two-dimensional scenario in which each geophone contains a vertical and single horizontal component, with the horizontal component oriented in the same vertical plane as the source and geophone. This is equivalent to assuming that we have knowledge of the azimuthal angle of incidence and have, for example, applied a transformation to the two horizontal components of a three-component geophone package to acquire the horizontal component along that angle. While a formulation of the full three-dimensional problem, where estimation of the azimuthal angle is also required for localization, can readily be performed by those familiar with the art, this two-dimensional scenario allows for greater clarity of presentation and adequately captures the essential considerations of source localization accuracy as produced by the present invention. Furthermore, although the exemplary geometry described here and presented in FIG. 21 depicts a single linear array of sensors, the expressions disclosed here apply for arbitrary sets of receiver positions within the two-dimensional plane analyzed and may be readily extended to arbitrary positions in three-dimensions by those familiar with the art.

Figure 21:
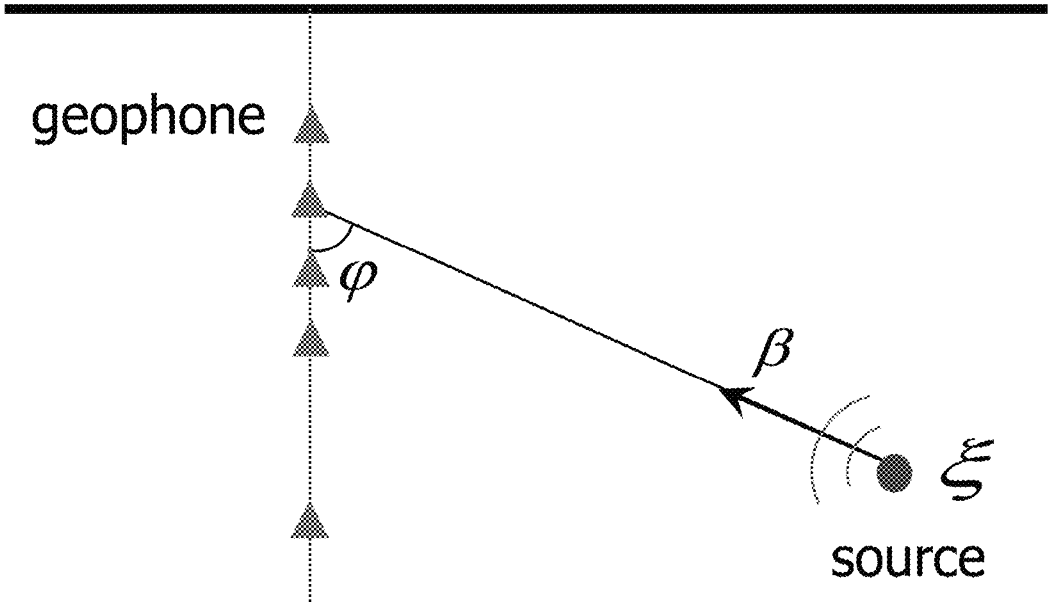
FIG. 21 illustrates the localization geometry, showing a source, an array of sensors, and the direction cosines and incidence angle between the source and one of the sensors.

Consider a source of transient microseismic energy, such as resulting from a fracture event, located at a position ξ in the presence of a set of M geophones at locations $x_m$, m=1, □, M, as shown in FIG. 21 The $m^{th}$ sensor is a distance I'm $$r_m = \|x_m - \xi\|$$

from the source. The column of direction cosines pointing from the source to the $m^{th}$ sensor is $$\beta_m = (x_m - \xi)/r_m = \begin{bmatrix} \cos\varphi_m \\ \sin\varphi_m \end{bmatrix},$$

where $\varphi_m$ denotes the angle of incidence at the $m^{th}$ sensor as depicted in FIG. 21. Similarly, the direction cosine vector pointing perpendicular to the $m^{th}$ source-geophone direction is $$\beta_m^{\perp} = \begin{bmatrix} -\sin\varphi_m \\ \cos\varphi_m \end{bmatrix}.$$

The composite matrix of all source-geophone direction cosines is $$B = [\beta_1 \ \dots \ \beta_M]^{\top},$$

and the composite matrix of all direction cosines perpendicular to the source-geophone directions is $$B^{\perp} = [\beta_1^{\perp} \ \dots \ \beta_M^{\perp}]^{\top}.$$

In this exemplary embodiment, the vertical and horizontal time series recorded at the $m^{th}$ geophone, denoted by the two-element column vector $g_m(t)$, is modeled as the sum of P-wave and S-wave arrivals from the source, $p_m(t)$ and $s_m(t)$, in a background of additive noise $n_m(t)$, $$g_m(t) = p_m(t - (t_0 + \tau_{p,m})) + s_m(t - (t_0 + \tau_{s,m})) + n_m(t).$$

A set of T samples encompassing the full duration of the signals $p_m(t)$ and $s_m(t)$ are recorded, t=0, □, T−1, at a sampling rate $f_s$. The DFT of $g_m(t)$ is then the sum of the P-wave, S-wave, and noise transforms, $$G_m(\omega) = P_m(\omega) + S_m(\omega) + N_m(\omega),$$

where the T transform bins ω=0, 1, □, T−1 represent frequencies in the range $$\left[0, 2\pi f_s \frac{T-1}{T}\right].$$

For a more concise notation, we form composite 2M×1 column vectors G(ω), P(ω), and S (@) by stacking the M individual geophone, P-wave, and S-wave transform vectors, respectively.

In this exemplary embodiment, we assume that the arriving P-wave and S-wave signals are deterministic but unknown, derive from a common source signal generated by a microseismic event, and can be fully described by a set of parameters θ. The additive noise is assumed to be random, drawn from a stationary Gaussian process, and independent sensor to sensor. Accordingly, the probability density of observing the geophone signal transforms at frequency ω is Gaussian, $$\wp(G(\omega;\theta)) = \mathcal{N}\left(\mu(\omega;\theta), \sum(\omega)\right), \quad (1)$$

where the composite 2M×1 mean vector μ(ω;θ), given by $$\mu(\omega;\theta) = P(\omega;\theta) + S(\omega;\theta),$$

is the sum of the P-wave and S-wave arrival transforms and thus dependent on the parameters θ, and the 2M×2M covariance matrix Σ(ω) is proportional to the noise power, $$\sum(\omega) = \sigma_n^2(\omega) I,$$

reflecting our assumption in this exemplary embodiment that the noise is uncorrelated sensor to sensor and additionally implying that the independent noise observations at each sensor have a common power spectra. The DFT bins G(ω) are mutually independent, and so the probability of observing the entire set of frequency bins is the product of the probabilities of observing each of the individual bins, $$\wp(G(\omega), \omega = [0, 1, \dots, T-1]; \theta) = \prod_{\omega=0}^{T-1} \wp(G(\omega);\theta).$$

It will be clear to those familiar with the art that other models for the recorded geophone time series data, $g_m(t)$, may be used with the presently disclosed invention in cases where the exemplary model described here may not best match or fully express the signals present in a recorded data set. For example, alternative models may include only the P-wave or S-wave arrival data or any combination of the direct-path arrivals for these propagation modes and one or more indirect arrivals such as reflections from geological surfaces or other reflections, converted-mode waves, head waves, or any other arrival of seismic energy that can be attributed to activity in the volume being monitored, and may account for noise with different structure than is assumed in this exemplary embodiment, such as noise that is correlated from one sensor to another at one or more frequencies and noise that has varying amounts of power, potentially at varying frequencies, from one sensor to another.

In the presently considered exemplary embodiment of the invention, the physical mechanism that gives rise to the microseismic waveforms is assumed to occur rapidly over some distance and accordingly radiates P and S disturbances into the surrounding rock that are scaled in time according to their propagation velocities. These radiated signals are then transformed by their respective radiation patterns, propagation losses and delays, and are scaled according to their polarizations and arrival direction. Accordingly, we model the $m^{th}$ P and S wave transforms as $$P_m(\omega) = \beta_m \alpha_p e^{-j\omega\tau_{p,m}} \cdot \psi(\omega/v_p),$$

$$S_m(\omega) = \beta_m^{\perp} \alpha_s e^{-j\omega\tau_{s,m}} \cdot \psi(\omega/v_s),$$

where $\psi(k)$ represents the microseismic pulse transform as a function of wavenumber k, which is stretched according to the respective propagation speeds to form the P-wave and S-wave pulses and includes any frequency-dependent propagation losses common to both waveforms, the constants $\alpha_p$ and $\alpha_s$ embody frequency-independent propagation losses and radiation pattern effects, the factors $e^{-j\omega\tau_{p,m}}$ and $e^{-j\omega\tau_{s,m}}$ represent the P-wave and S-wave propagation times between the source and $m^{th}$ geophone, and the geophone vertical and horizontal axis dipole responses are incorporated via the direction cosines $\beta_m$ and $$\beta_m^{\perp}.$$

It will be clear to those familiar with the art that alternative models for the signals associated with various arrivals of seismic energy observed at a set of sensors may be used with the presently disclosed invention in cases where the exemplary model described here may not best match or fully express the signals present in a recorded data set.

Given a set of observations g drawn from a probability density $\wp(g;\theta)$ dependent on parameters $\theta$, the variance of any unbiased estimate of the parameters $\hat{\theta}$ is bounded below by the information inequality, commonly referred to as the Cramér-Rao bound (CRB), $$\mathrm{Var}\{\hat{\theta}\} \geq J_\theta^{-1}.$$

Here, $J_\theta$ is the Fisher information matrix for parameters $\theta$, $$J_\theta = E\left\{\frac{\partial \ln\wp}{\partial\theta} \cdot \frac{\partial \ln\wp}{\partial\theta^T}\right\},$$

where $E[\cdot]$ denotes expectation.

In the present exemplary embodiment, we will use the fact that for Gaussian observations $G(\omega)$ with mean dependent on parameters $\theta$, c.f. Equation (1), the Fisher information for $\theta$ at frequency $\omega$ is $$J_\theta(\omega) = \frac{\partial\mu^T(\omega)}{\partial\theta}\sum\nolimits^{-1}(\omega)\frac{\partial\mu(\omega)}{\partial\theta^T}.$$

Additionally, because the observations $G(\omega)$ are statically independent frequency to frequency, the Fisher information at each frequency add and we have that the total Fisher information for the parameters $\theta$ is $$J_\theta = \sum_{k=0}^{T-1} J_\theta(\omega_k).$$

In this exemplary embodiment, we define the set of parameters $\theta$ on which the probability distribution of our observations depends as $$\theta(\omega) = \left[\tau_p^T \tau_s^T \varphi^T \psi(\omega)\right]^T,$$

where $\tau_p$ and $\tau_s$ are vectors containing the P-wave and S-wave arrival times at each of the M sensors, $\varphi$ is a vector containing the P-wave and S-wave arrival polarization angles at each of the M sensors, and $\psi(k)$ represents the microseismic pulse transform, as described previously. Using the previously stated exemplary signal model and previously stated equations, the Fisher information for the first three of these parameters can be shown to be $$J_{\tau_p,\tau_s,\varphi} = \begin{bmatrix} DSNR_p \cdot I & 0 & 0 \\ 0 & DSNR_s \cdot I & 0 \\ 0 & 0 & SNR \cdot I \end{bmatrix}, \text{ where}$$

$$DSNR_p = \sum_{\omega=0}^{T-1} \frac{\omega^2 \alpha_p^2 \cdot \psi^2(\omega/v_p)}{\sigma_n^2(\omega)} \text{ and}$$

$$DSNR_s = \sum_{\omega=0}^{T-1} \frac{\omega^2 \alpha_s^2 \cdot \psi^2(\omega/v_s)}{\sigma_n^2(\omega)}$$

are the P-wave and S-wave $DSNR_s$, or "derivative signal-to-noise ratios", and the SNR, or "signal-to-noise ratio" is defined as the sum of the P-wave and S-wave individual $SNR_s$, $$SNR_p = \sum_{\omega=0}^{T-1} \alpha_p^2 \cdot \frac{\psi^2(\omega/v_p)}{\sigma_n^2(\omega)} = \sum_{\omega=0}^{T-1} SNR_p(\omega),$$

$$SNR_s = \sum_{\omega=0}^{T-1} \alpha_s^2 \cdot \frac{\psi^2(\omega/v_s)}{\sigma_n^2(\omega)} = \sum_{\omega=0}^{T-1} SNR_s(\omega), \text{ as}$$

$$SNR = SNR_p + SNR_s.$$

Further applying the previously stated equations, we can derive the lower bound variance for P-wave and S-wave arrival time estimates as $$\mathrm{Var}\begin{bmatrix}\hat{\tau}_p\\ \hat{\tau}_s\end{bmatrix} \geq (J^{-1})_{\tau_p,\tau_s} = \begin{bmatrix}\frac{1}{DSNR_p}\cdot I & 0\\ 0 & \frac{1}{DSNR_s}\cdot I\end{bmatrix}$$

for the presently discussed exemplary embodiment of the invention. Note that the P-wave and S-wave arrival time estimates ($\hat{\tau}_p$, and $\hat{\tau}_s$) may have notably different variances and that the arrival time estimates may have different variances for each mode at various sensors across one or more arrays.

Additionally, we can derive the lower bound variance for polarization estimates as $$\mathrm{Var}\{\hat{\varphi}\} \geq (J^{-1})_{\varphi} = \frac{1}{SNR}\cdot I,$$

which also exhibits the properties that estimate variances may be different for various wave modes and sensors.

Alternatively, we can apply the previously stated equations to determine the variance associated with estimates of event location, which necessarily require that we simultaneously estimate the unknown event occurrence time, $t_0$, using intermediately estimated values of the parameters we have just examined. In this case, the Fisher information with respect to event location and origin time is given by $$J_{\xi,t_0}(\omega) = \frac{\partial\theta(\omega)^T}{\partial\begin{bmatrix}\xi\\ t_0\end{bmatrix}} J_\theta(\omega)\frac{\partial\theta(\omega)}{[\partial\xi^T t_0]}$$

where the parameters $\theta(\omega)$ are $$\theta(\omega)^T = [\tau_p^T \tau_s^T \varphi^T \psi(\omega_k)],$$

or, using the compacted notation $$\tau = \begin{bmatrix}\tau_p\\ \tau_s\end{bmatrix}, \text{ as}$$

$$\theta(\omega)^T = [\tau^T \varphi^T \psi(\omega_k)].$$

Derivatives of travel times $\tau_p$ and $\tau_s$ with respect to event location (or origin time) may be estimated numerically from a travel-time table of the type typically generated through forward modeling for use in performing microseismic event localization. Derivatives of the arrival polarizations $\varphi$ may similarly be estimated numerically using a table containing the forward-modeled arrival polarizations. Alternatively, these derivatives may be calculated using analytic functions. In this case, we can express these partial derivatives as $$\frac{\partial\theta^T}{\partial\xi} = \begin{bmatrix}\frac{\partial\tau^T}{\partial\xi} & \frac{\partial\varphi^T}{\partial\xi} & 0\end{bmatrix}, \text{ and}$$

$$\frac{\partial\theta^T}{\partial t_0} = [1^T \ \ 0 \ \ 0].$$

Substituting into our expression for the Fisher information, we then have $$J_{\xi,t_0}(\omega) = \begin{bmatrix}\frac{\partial\tau^T}{\partial\xi}J_\tau(\omega)\frac{\partial\tau}{\partial\xi^T} + \frac{\partial\varphi^T}{\partial\xi}J_\varphi(\omega)\frac{\partial\varphi}{\partial\xi^T} & \frac{\partial\tau^T}{\partial\xi}J_\tau(\omega)1\\ 1^T J_\tau(\omega)\frac{\partial\tau}{\partial\xi^T} & 1^T J_\tau(\omega)1\end{bmatrix},$$

or, summing over ω=0, 1, □ , T−1, that $$J_{\xi,t_0} = \begin{bmatrix}\frac{\partial\tau^T}{\partial\xi}J_\tau\frac{\partial\tau}{\partial\xi^T} + \frac{\partial\varphi^T}{\partial\xi}J_\varphi\frac{\partial\varphi^T}{\partial\xi^T} & \frac{\partial\tau^T}{\partial\xi}J_\tau 1\\ 1^T J_\tau\frac{\partial\tau}{\partial\xi^T} & 1^T J_\tau 1\end{bmatrix}.$$

Inverting this expression and taking the (1, 1) entry yields an expression for the lower bound variance of event location estimates, $$(J_{\xi,t_0})_\xi^{-1} = \left(\frac{\partial\tau^T}{\partial\xi}J_\tau\frac{\partial\tau}{\partial\xi^T} + \frac{\partial\varphi^T}{\partial\xi}J_\varphi\frac{\partial\varphi}{\partial\xi^T} - \frac{\frac{\partial\tau^T}{\partial\xi}J_\tau 1 1^T J_\tau\frac{\partial\tau}{\partial\xi^T}}{1^T J_\tau 1}\right)^{-1}. \quad (2)$$

This expression can be interpreted as showing that unknown to removes information along the weighted mean of $\tau$.

Similarly, taking the (2, 2) entry of the inverted matrix yields an expression for the lower bound variance of event occurrence time estimates, $$(J_{\xi,t_0})_{t_0}^{-1} = \left(1^T J_\tau\frac{\partial\tau}{\partial\xi^T}\left[\frac{\partial\tau^T}{\partial\xi}J_\tau\frac{\partial\tau}{\partial\xi^T} + \frac{\partial\varphi^T}{\partial\xi}J_\varphi\frac{\partial\varphi}{\partial\xi^T}\right]^{-1}\frac{\partial\tau^T}{\partial\xi}J_\tau 1\right)^{-1}.$$

Event location can be estimated directly from the seismic data, as presented above, or alternatively, intermediate parameters such as arrival times and polarizations may be measured from the raw seismic data and, in turn, position and event time estimated from these measurements. Provided that the intermediate parameters are measured efficiently, i.e. unbiased with measurement variance equal to the information inequality, the measurements are so-called sufficient statistics, and the event position and event time information they contain will be no less than the information present in the raw seismic trace data. Assuming the set of arrival times and polarizations are efficiently measured, their probability distribution is Gaussian, $$\wp(\hat{\tau}, \hat{\varphi}; \xi, t_0) = N(\mu(\xi, t_0), \textstyle\sum),$$

with uncorrelated arrival times and polarizations, $$\sum = \begin{bmatrix}\sum_\tau & 0\\ 0 & \sum_\varphi\end{bmatrix}.$$

The associated likelihood function of event location and origin time estimated from these sufficient statistics is $$\ell(\xi, t_0; \tilde{\tau}, \tilde{\varphi}) = -\frac{1}{2}\ln\det\left(2\pi\sum\right) - \frac{1}{2}(\tilde{\tau} - \tau(\xi, t_0))^{\top}\sum\nolimits_{\tau}^{-1}(\tilde{\tau} - \tau(\xi, t_0)) - \frac{1}{2}(\tilde{\varphi} - \varphi(\xi))^{\top}(\tilde{\varphi} - \varphi(\xi)).$$

Entries in this expression may be found as follows: $\varphi(\xi)$ can be found for a given event location $\xi$ by performing table-lookup on a table of arrival polarizations that has been pre-generated using forward modeling techniques; similarly, $\tau(\xi, t_0)$, the set of arrival times observed by all sensors for an event occurring at location $\xi$ and time $t_0$, can be found by using a pre-generated travel-time table containing values $\tau(\xi)$, the set of travel times from location $\xi$ to all sensors in the monitoring array (which may be determined through forward modeling), and an estimate of the event origin time $t_0$ given a presumed event location and measured arrival times, calculated as $$\hat{t}_0(\xi) = \frac{1^{\top}\sum_{\tau}^{-1}(\tilde{\tau} - \tau(\xi))}{1^{\top}\sum_{\tau}^{-1}1},$$

using the equation $$\tau(\xi, t_0) = \tau(\xi) + 1t_0.$$

The covariance matrices associated with arrival time and polarization estimates, $\tau_{\tau}$, and $\Sigma_{\varphi}$, respectively, can be taken to be the lower bound variances presented previously, which will be equivalent to the variances that occur when these parameters are estimated using maximum likelihood techniques in favorable conditions. Alternatively, in the absence of reliable SNR or DSNR information, which are necessary for computing the previously stated lower bound variances of the statistics, and preferably in the presence of a large number of sensors (say, 40), the travel time and polarization covariances used in computing the position variance may be estimated by noting the variance present in the difference between the measured travel times (or polarizations) and those computed based on the estimated position. To distinguish between position errors resulting from an imperfect velocity model, which would lead to a bias in position estimates, and position errors which are statistical in nature and result from measuring event arrivals in an additive seismic background, the needed variances may be computed by removing a smooth function such as an affine function of sensor level which best fits, say in a least-squares sense, the time of arrival modeling error (or polarization modeling error), and then computing its variance.

Finding the optimal $t_0$ estimate as described above for each location yields an expression for the likelihood function of event location alone, $$\ell(\xi; \tilde{\tau}, \tilde{\varphi}) = -\frac{1}{2}\ln\det\left(2\pi\sum\right) - \frac{1}{2}(\tilde{\tau} - \tau(\xi, t_0))^{\top}\left(\sum\nolimits_{\tau}^{-1} - \frac{\sum_{\tau}^{-1}11^{\top}\sum_{\tau}^{-1}}{1^{\top}\sum_{\tau}^{-1}1}\right)(\tilde{\tau} - \tau(\xi, t_0)) - \frac{1}{2}(\tilde{\varphi} - \varphi(\xi))^{\top}\sum\nolimits_{\varphi}^{-1}(\tilde{\varphi} - \varphi(\xi))$$

Without loss of generality, for simplicity and clarity of presentation, consider an exemplary case where the only statistic used in localization is $\tau$. In such a case, the likelihood function for event location can be written as $$\ell(\xi; \tilde{\tau}) = -\frac{1}{2}(\tilde{\tau} - \tau(\xi))^{\top}\Delta(\tilde{\tau} - \tau(\xi))$$

where $$\Delta = \sum\nolimits_{\tau}^{-1} - \frac{\sum_{\tau}^{-1}11^{\top}\sum_{\tau}^{-1}}{1^{\top}\sum_{\tau}^{-1}1}.$$

Then the ML estimate, denoted as $$\hat{\xi}_{ML} = \arg\max_{\xi} \ell(\xi, \tilde{\tau}),$$

can be found as the position where the derivative of the likelihood function with respect to event location, $$\frac{\partial \ell(\xi; \tilde{\tau})}{\partial \xi} = \frac{\partial \tau^{\top}}{\partial \xi}\Delta(\tilde{\tau} - \tau(\xi)),$$

is zero, that is, $$\left.\frac{\partial \ell(\xi, \tilde{\tau})}{\partial \xi}\right|_{\hat{\xi}_{ML}} = 0.$$

In the small error region, we have by Taylor series expansion that $$\tau(\xi) \approx \tau(\xi_0) + \frac{\partial \tau}{\partial \xi^{\top}}(\xi - \xi_0),$$

where $\xi_0$ is the true event location. Combining these equations, we have that the maximum likelihood estimate of event location in this exemplary embodiment is given by $$\hat{\xi}_{ML} = \xi_0 + \left(\frac{\partial \tau^{\top}}{\partial \xi}\Delta\frac{\partial \tau}{\partial \xi^{\top}}\right)^{-1}\frac{\partial \tau^{\top}}{\partial \xi}\Delta(\tilde{\tau} - \tau(\xi_0)).$$

Under these conditions, the maximum likelihood estimate is unbiased and has associated variance $$\mathrm{Var}\{\hat{\xi}_{ML}\} = \left(\frac{\partial \tau^{\top}}{\partial \xi}\Delta\frac{\partial \tau}{\partial \xi^{\top}}\right)^{-1}.$$

If we replace the matrix $\Sigma_{\tau}$ in the previously derived likelihood expression with the symmetric weighting matrix W, the likelihood becomes a weighted sum of square travel time errors $$\ell_W(\xi, t_0; \tilde{\tau}) = -\frac{1}{2}(\tilde{\tau} - \tau(\xi) - 1t_0)^{\top}W(\tilde{\tau} - \tau(\xi) - 1t_0),$$

where $$t_0(\xi) = \frac{1^{\top}W(\tilde{\tau} - \tau(\xi))}{1^{\top}W1}$$

gives our best estimate of the origin time $t_0$ for any location $\xi$, and thus we have $$\ell_W(\xi, t_0; \tilde{\tau}) = -\frac{1}{2}(\tilde{\tau} - \tau(\xi))^\top \Delta_W(\tilde{\tau} - \tau(\xi))$$

where $$\Delta_W = W - \frac{W11^\top W}{1^\top W1}.$$

Maximizing $\ell_W$ then yields an event location estimate $$\hat{\xi}_W = \xi_0 + \left(\frac{\partial \tau^\top}{\partial \xi}\Delta_W\frac{\partial \tau}{\partial \xi^\top}\right)^{-1}\frac{\partial \tau^\top}{\partial \xi}\Delta_W(\tilde{\tau} - \tau(\xi_0)),$$

which is unbiased and has variance $$\mathrm{Var}\{\hat{\xi}_W\} = \left[\frac{\partial \tau^\top}{\partial \xi}\Delta_W\frac{\partial \tau}{\partial \xi^\top}\right]^{-1}\frac{\partial \tau^\top}{\partial \xi}\Delta_W\sum\nolimits_\tau \Delta_W\frac{\partial \tau}{\partial \xi^\top}\left[\frac{\partial \tau^\top}{\partial \xi}\Delta_W\frac{\partial \tau}{\partial \xi^T}\right]^{-1}.$$

It can be shown that this variance is greater than or equal to the inverse Fisher information, with equality occurring when the weighting matrix W is set to the inverse covariance of the measured arrival times, $$W = \sum\nolimits_\tau^{-1}.$$

In this case, the least-squares estimate is the maximum likelihood estimate, $$\hat{\xi}_W = \hat{\xi}_{ML}.$$

It should be noted that the least-squares position estimates described above can be modified to incorporate measured arrival polarizations or other measurements related to position. For example, in the case that polarizations and travel time measurements are both used, the position is estimated as the one minimizing the weighted sum of square errors, $$[\tilde{\tau} - \tau(\xi, t_0)]^T\left[W_\tau - \frac{W_\tau 11^\top W_\tau}{1^T W_\tau 1}\right][\tilde{\tau} - \tau(\xi, t_0)] + [\tilde{\varphi} - \varphi(\xi)]^\top W_\varphi[\tilde{\varphi} - \varphi(\xi)].$$

In this case, the variance is given by Equation (2), with $J_\tau$ and $J_\varphi$ replaced by $W_\tau$ and $W_\varphi$, the respective travel-time and polarization weighting matrices. As above, when the weighting matrices are set to the corresponding Fisher informations, $J_\tau$ and $J_\varphi$, the estimate variance is minimized and attains the CRB. This is consistent with the idea that small-error-region estimates are roughly Gaussian since $\tilde{\tau}$ and $\tilde{\varphi}$ are roughly Gaussian and $\hat{\xi}_{ML}$ and $\hat{\xi}_W$ are linear in $\tilde{\tau}$ and $\varphi$.

Finally, we note that the optimal weighting matrices used with semblance localization techniques would be the inverse of the seismic background covariance matrix.

The foregoing may be used to compute confidence intervals inside of which a specified percentage of statistically independent events are expected to lie. The confidence interval applicable in the small-error region (and somewhat conservative in the large-error region) may be found by selecting a fraction $\eta$ and computing a level $\lambda(\eta)$ as the inverse of the $\chi^2$ cumulative distribution function evaluated at $\eta$ and for the number of degrees of freedom equal to the number of dimensions of the space of position estimates, $$(\xi - \xi)^\top J\left(\xi - \hat{\xi}\right) \le \lambda(\eta).$$

We now describe the computation of the probability density of the maximum likelihood position estimate. Recall that, in the small-error region, the weighted least-squares and maximum likelihood estimates are approximately Gaussian distributed. Here, we describe a position probability density that is valid in the small-error region as well as away from the small-error region. For clarity of presentation, we consider the case of estimating position based only on measured arrival times $\tilde{\tau}$.

The maximum likelihood position estimate $\hat{\xi}_{ML}$ is the position maximizing the log likelihood, $$\hat{\xi}_{ML} = \arg\max_\xi\left\{-\frac{1}{2}(\tilde{\tau} - \tau(\xi))^\top \Delta\left(\tilde{\tau} - \tau(\xi)\right)\right\},$$

where, recall, $$\Delta = \sum\nolimits_\tau^{-1} - \frac{\sum_\tau^{-1} 11^\top \sum_\tau^{-1}}{1^\top \sum_\tau^{-1} 1},$$

and where $\tau(\xi)$ is the column of travel times produced by an hypothesized position $\xi$. The maximum likelihood estimate then obeys $$\frac{\partial \tau^\top}{\partial \xi_{ML}}\Delta\left[\tilde{\tau} - \tau\left(\hat{\xi}_{ML}\right)\right] = 0, \tag{3}$$

the arrival time sensitivity to changes in position $\partial\tau^T/\partial\hat{\xi}_{ML}$ being evaluated at the maximum likelihood estimate position.

Note that for a given maximum likelihood estimate, Equation (3) defines a subspace in the space of arrival times, any point in which would satisfy Equation (3) and produce the same estimate. The probability of estimating a given position can then be computed by finding the weighted volume of the arrival time subspace which produces that position, where the weighting is the probability of measuring any given arrival time vector in the subspace, $$\wp(\xi) = \int_{\tau \in \tilde{\tau}_0} \wp(\tau)d\tau.$$

Carrying out the computation, the probability of estimating $\hat{\xi}$ from measurements $\tilde{\tau}$ is $$\wp(\xi) = \frac{\exp\left\{-\frac{1}{2}[\tau(\xi) - \tau^*]^\top \Delta\frac{\partial \tau}{\partial \xi^\top}\left(\frac{\partial \tau^\top}{\partial \xi}\Delta\frac{\partial \tau}{\partial \xi^\top}\right)^{-1}\frac{\partial \tau^\top}{\partial \xi}\Delta[\tau(\xi) - \tau^*]\right\}}{\left|2\pi\frac{\partial \tau^\top}{\partial \xi}\Delta\frac{\partial \tau}{\partial \xi^\top}\right|^{\frac{1}{2}}}, \tag{4}$$

where $\tau^*$ are the true travel times and $|\cdot|$ represents the determinant operator. In the small-error region (loosely, in the presence of accurate estimates), the travel times can be approximated using $$\tau(\xi) \approx \tau^* + \frac{\partial \tau}{\partial \xi^\top}(\xi - \xi^*)$$

and the position estimate probability density reduces to $$\wp(\xi) \approx \frac{\exp\left\{-\frac{1}{2}[\xi - \xi^*]^\top J_{\xi^*}[\xi - \xi^*]\right\}}{\left|2\pi J_{\xi^*}^{-1}\right|^{\frac{1}{2}}},$$

where $J_\xi$ is the Fisher information in the measured travel times, evaluated at the true position $\xi^*$. Note that this is the expected Gaussian distribution, with the true position as the mean and the bound variance as the covariance.

As above, when computing the position probability described in Equation (4) or estimate variance or probability contours, the position estimate may be used in place of the true position, and the "true" travel times computed based on the estimated position. Also, it may be convenient to compute the normalization (the determinant) numerically by dividing each voxel probability by the total of the voxel probabilities.

Note that the probability density described in Equation (4) approximates the likelihood function evaluated using the true travel times in place of the measured travel times, and with the matrix $\Delta$ in essence projected onto the space spanned by the time delay sensitivity to position changes, and normalized to be a probability. This comparison suggests using the likelihood function, evaluated using travel times computed from the estimated position in place of the measured travel times, and appropriately normalized, as an approximation to the probability density and expected to be valid over a wide range of estimate accuracy regions, $$\wp(\xi) \approx \frac{\exp\left\{-\frac{1}{2}[\tau(\xi) - \tau^*]^\top \Delta[\tau(\xi) - \tau^*]\right\}}{\left|2\pi J_{\xi^*}^{-1}\right|^{\frac{1}{2}}}.$$

This computation is less demanding than that of Equation (4), and if the normalization is computed numerically, no derivatives need be computed.

It is useful to point out that to capture the details of a position estimate probability density, the grid on which it is evaluated should have its points spaced at least as close to each other as one standard deviation in the dimension of interest as described by the inverse Fisher information. Additionally, note that by replacing the $\Sigma^{-1}$ used in computing $\Delta$ with W, the probability density expressions above become applicable to weighted least squares position estimates.

2. Aggregate Activity Statistics

According to certain other aspects to be described now in more detail below, embodiments of the invention include techniques for deriving aggregate statistics from a set of event location estimates, including a method for computing the probability that an event occurred in any given volume, and another for describing the smallest volume that contains a specified percentage of the event probability or expected to contain the specified percentage of the events. These aggregate statistics may be used to estimate total stimulated volume, as well as to evaluate the plausibility of hypothesized fracture networks.

Given a grid of voxels $v_\xi$, indexed by position $\xi$ within a volume of interest, and a set of K events, the probability that an event occurred in a given voxel $p(v_\xi)$ is one minus the probability that no event occurred in the voxel. Since the event position estimates are statistically independent, the probability that no event occurred in the voxel is the product of the probabilities that each of the events are not in the voxel. Stated mathematically, $$p(v_\xi) = 1 - \prod_{k=1}^{K}[1 - p_k(v_\xi)], \tag{5}$$

where the quantity $p_k(v_\xi)$ represents the probability that event k occurred within the voxel.

The probability $p_k(v_\xi)$ is well approximated by $$p_k(v_\xi) \approx \wp_k(v_\xi)dV$$

where $p_k(\xi)$ is the probability density associated with the $k^{th}$ position estimate $\hat{\xi}_k$ (say, computed using Equation (4) above), evaluated at a position in the voxel $v_\xi$, and dV is the volume of the voxel.

The quantity $p(v_\xi)$ is referred to as the probability volume, and may be computed using Equation 5 by evaluating one voxel position for each of the event probabilities, or all voxel positions, accumulating the probability for each new event. This latter approach would be useful for real-time applications in which the events are detected and localized in sequence. Of course, the expression Equation 5 is easily computed using a parallel process.

When computing the probability volume, the voxels should be sized so that, in each dimension, they are no larger than the standard deviation in that dimension of the most accurate estimate along that dimension in the collection. In this way, narrow peaks in the accurately estimated position probabilities are not missed, and, in cases that the probabilities are not normalized using the analytic expression, the probabilities can be accurately normalized by summing across the set of voxels.

The probability volume may be normalized so that its sum over all voxels is equal to the number of events. In this way, a volume containing a given fraction of the probability would be expected to contain that fraction of events. The probability volume can also be normalized to sum to one.

It might be the case that one dimension, say depth, is accurately estimated, while another dimension is not. In such cases it is useful to compute the probability volume on a grid with smaller spacing along the accurately estimated axis. The high resolution along any given axis needed for accurate computation of the probability volume may not necessary for analysis or interpretation of the probability volume. In such cases, it is suggested that the voxel probabilities, computed on the high-resolution grid, be down-sampled to a more coarsely sampled grid by summing the probabilities in the high-resolution voxels associated with each coarse-grid voxel. Furthermore, if a projection onto a lower-dimensional space, say a two-dimensional plan or elevation, is desired, the voxel probabilities may be summed along lines perpendicular to the lower-dimensional space.

The voxel probabilities comprising a probability volume can be transformed to generate a quantity called the confidence volume, $c(v_\xi,\lambda)$, defined as the smallest volume containing a given fraction $\lambda$ of the probability. It is computed by summing the largest voxel probabilities until the prescribed fraction is achieved. Alternatively, it may be computed by first sorting the voxel probabilities from the highest value to the lowest value, and noting the cumulative sum, starting with the highest value. Then, the cumulative sum is normalized to be one when all voxel probabilities are included. Finally, a smooth function relating the sorted probabilities to the cumulative sum is formed by interpolating a table of, say, a hundred confidence levels and the associated sorted voxel probabilities. This function can then be used to replace each voxel probability with a voxel confidence.

The event position estimate variances and probabilities, as well as the event collection probability and confidence volumes may be used in estimating the stimulated fracture network, particularly in evaluating the plausibility of potential fracture networks. For example, a model of how fracture networks form, informed by the physics of fracture formation and information about the treatment site such as from seismic incoherence or other measurements, can be used to produce candidate fracture networks, traversing a collection of voxels in the treatment space. The plausibility of each candidate can be evaluated making use of the sum of the fracture voxel probabilities in the probability volume—the higher the sum (normalized for the length and shape of network), the more plausible the network relative to the microseismic data. (Other factors, having to do with the manner in which fractures form, for instance, should also be included in evaluating the plausibility of candidate fracture networks.) Alternatively, the weighted sum of event distances to the network, measured relative to the covariance of each event (similar to the event confidence levels), may be used—the smaller the total distance, the better the fit to the microseismic data. In another approach, models regarding the formation of fracture networks over time can be updated using event probabilities computed using the methods described herein. Additionally, the probability volume can be used as a Bayesian prior, as well as a Baysean update to a model of fracture network formation.

3. Event Estimate Statistics Display

According to certain additional aspects to be described now in more detail below, embodiments of the invention include methods for displaying information regarding microseismic events that leverage the error analyses of embodiments of the invention described above. For example, while collections of events are conventionally displayed as spheres arranged in the treatment volume and sized according event magnitude, the event position estimate variances of embodiments of the invention allow the events to be displayed as a set of error ellipses, each with a size and transparency set according to its position variance. The aggregate statistics may also be displayed in any number of dimensions, for instance by varying transparency or as boundaries at prescribed probabilities or confidences. All such displays can be overlaid on or with other features, such as seismic incoherence, to aid interpretation.

In these and other embodiments, a region in space is divided into voxels, each preferably no larger than the greatest event localization accuracy, and the probability that each voxel in the region contains an event, the probability volume, is computed. Each voxel is then displayed using characteristics (e.g., color, intensity, transparency) that reflect the computed probability. In this way, an estimate with high variance will slightly darken a range of voxels in the region, whereas an accurately localized event will noticeably darken just a few voxels. In another embodiment, the intermediate step of computing the probability volume is skipped, and each event is in turn used to modify the properties of a set of voxels in the neighborhood of the estimated event location. In a preferred embodiment, the region would be an ellipsoid, sized according to the estimate variance, and the modification each event would affect would be a nonlinear decrease in the transparency according to the estimate variance.

These and other embodiments of the invention will now be described in more detail with reference to the drawings.

Figure 4:
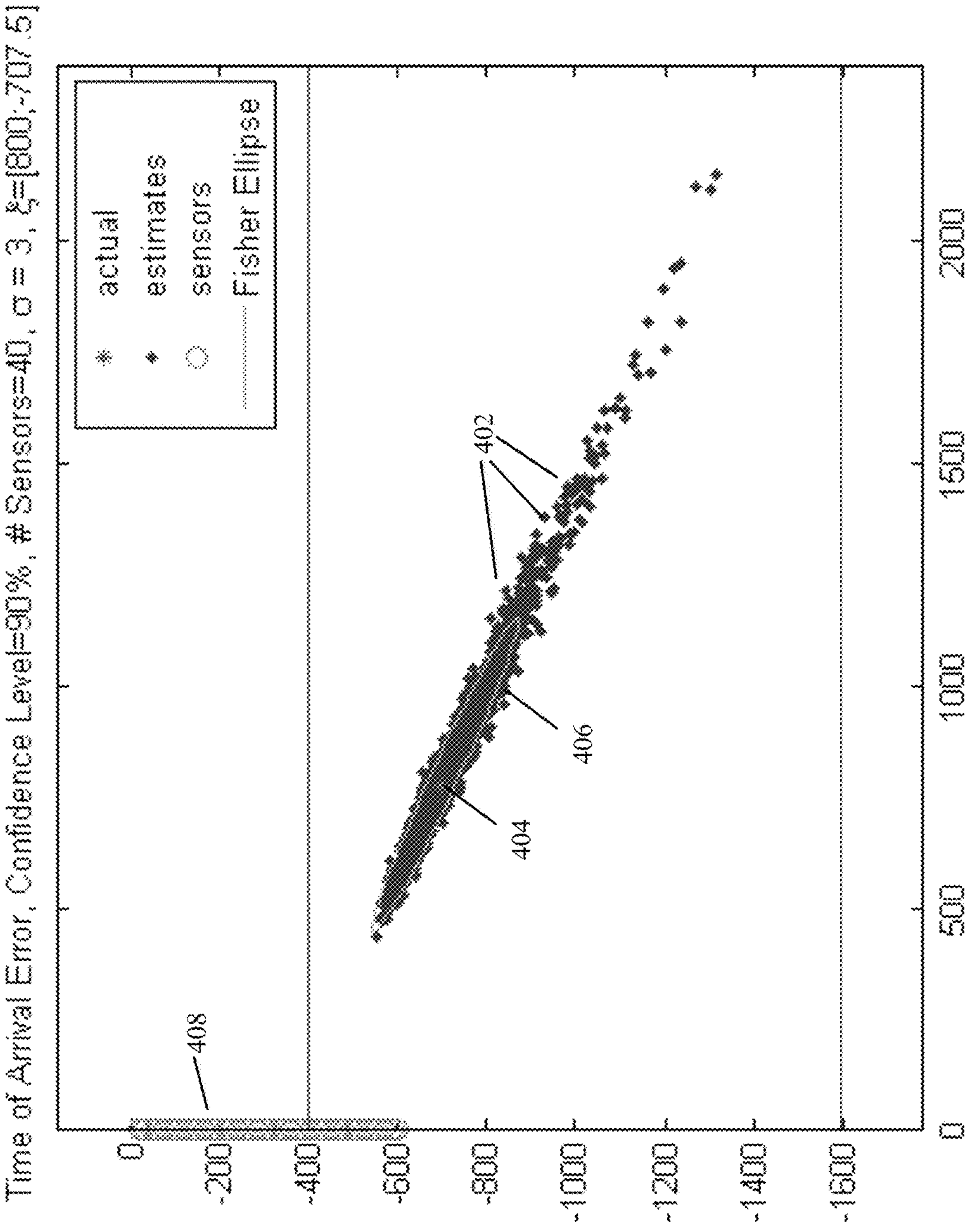
FIG. 4 depicts the results of a Monte Carlo simulation, showing a spread of estimated event locations near the actual event location for which synthetic data was generated.

Given that a microseismic event has occurred at the marked "actual" event location 404 in FIG. 4, transient arrivals of released seismic energy may be observed at a nearby downhole geophone array 408. Properties of these arrivals, such as their timing and polarizations, may be used to determine the location where the event occurred through the application of localization techniques known to those skilled in the art; however, the true event location cannot be determined exactly from the recorded data because the microseismic event signals are contaminated with other additive signals such as seismic background energy, obscuring the details of the transient arrivals. This limitation exists even if exact knowledge of the propagation between the event location and the geophone array is available, as there will still be unrelated, contaminating energy in the recorded geophone signals with structure that cannot fully be understood or modeled.

The effect of this contaminating energy on resulting event location estimates can be observed through Monte Carlo simulation by generating synthetic data for a microseismic event occurring at a known location and then adding varying instances of randomized noise with a defined set of properties (such as average energy) to this data and determining the event location estimate that would result if this noise-contaminated data were to be processed using one of the localization techniques known to those skilled in the art. FIG. 4 depicts the results of one such Monte Carlo simulation, showing a spread of estimated event locations 402 that is most concentrated near the actual event location for which synthetic data was generated, but which extends considerably away from this true location.

Acknowledging that this limitation is fundamental to the problem of microseismic event localization because data recorded by monitoring geophones will always be contaminated with some amount of unrelated seismic energy that cannot be modeled, fully understood, or predicted, it is desirable to understand the uncertainty associated with each event location estimate. This understanding may include not just a 1-dimensional amount of uncertainty associated with a given estimate (as in more or less certain), but an understanding of the spatial distribution of this uncertainty; the directions or volumes in which the estimate error is likely to have perturbed the resulting location estimate in relation to the event's true location.

Figure 5:
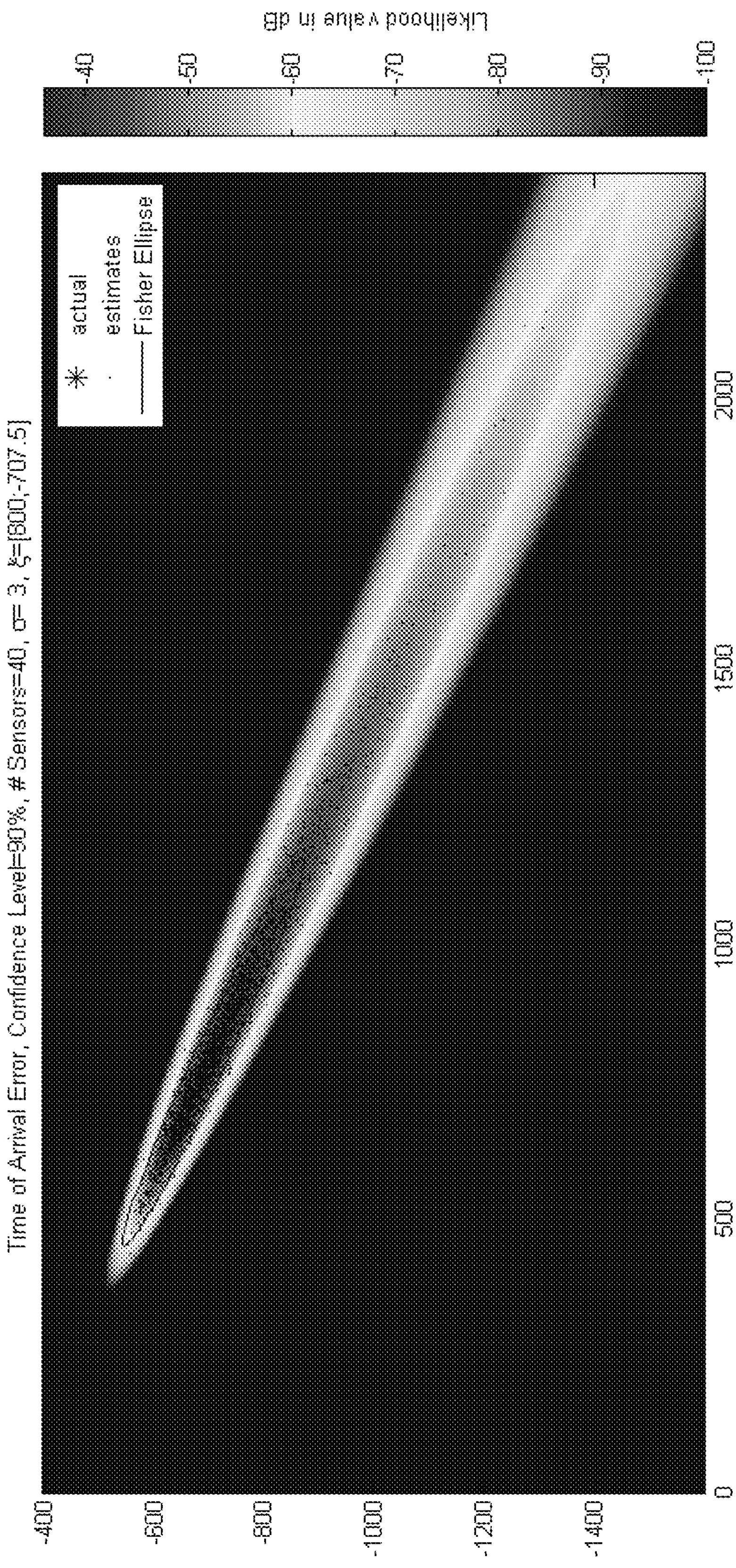
FIG. 5 illustrates a Fisher Ellipse associated with a 90% confidence level drawn around estimated event locations according to embodiments of the invention.

One way of describing this spatial distribution is through the definition of an error ellipse 406 or ellipsoid, representing a linear approximation of the error distribution. The shape of this ellipse will be given by properties such as the monitoring array geometry relative to the event location, the local propagation medium, and various properties of the observed data such as signal-to-noise ratio. The size of the ellipse will also be determined by these properties but may further be scaled to reflect various confidence levels. This is further depicted in FIG. 5, where the Fisher Ellipse 502 associated with a 90% confidence level has been drawn, meaning that the depicted ellipse is expected to contain 90% of the perturbed event location estimates. It can be seen that this ellipse, which has been produced predictively through the use of analytical methods of the invention and not derived from the results of the Monte Carlo simulation, exhibits the same spatial orientation as the estimated event locations 504 and thus captures the dominant directions in which location estimate uncertainty occurs for the depicted case. It may additionally be verified that the associated confidence level is accurate and that the depicted ellipse encloses approximately 90% of the simulated event location estimates, as will be described in more detail below.

Location estimate uncertainty may also be understood in terms of a likelihood function, which expresses the likelihood that an event occurred at a location given the data observed at the monitoring array. This function has the advantage that it is not a linearization like the ellipsoidal representation, and thus can capture non-linear aspects of the localization uncertainty; however, because of this it is also less succinct. Under favorable conditions, location estimates will be near the true location and a linearization of the error about either of these locations will be accurate across a region or volume that includes them both. In this region, contours of the likelihood function and the Fisher ellipse associated with that location estimate are expected to coincide. In the case of larger errors, the likelihood function will provide a more accurate assessment of uncertainty than the linearized assessment provided by the Fisher ellipse.

For example, FIG. 4 is a graphical representation of the probabilistic interpretation of microseismic event location estimation and associated estimate accuracy according to aspects of the invention. The results of a Monte Carlo simulation are displayed: synthetic microseismic data is produced for an event occurring at a known location 404 and numerous contaminated versions of the data are generated by adding randomized noise to simulate data recorded by a geophone array in the presence of seismic background energy or other noise. Event location estimates 402 are then made from these sets of contaminated data using the maximum likelihood estimator disclosed above. The resulting location estimates are scattered around the true event location 404. An error ellipse 406 derived using the information inequality and the Fisher information associated with this particular localization example is plotted, showing how the spatial distribution of event location estimates is well predicted by the theory and summarized by this ellipse. The simulated locations of monitoring sensors are depicted in the upper left.

Figure 6:
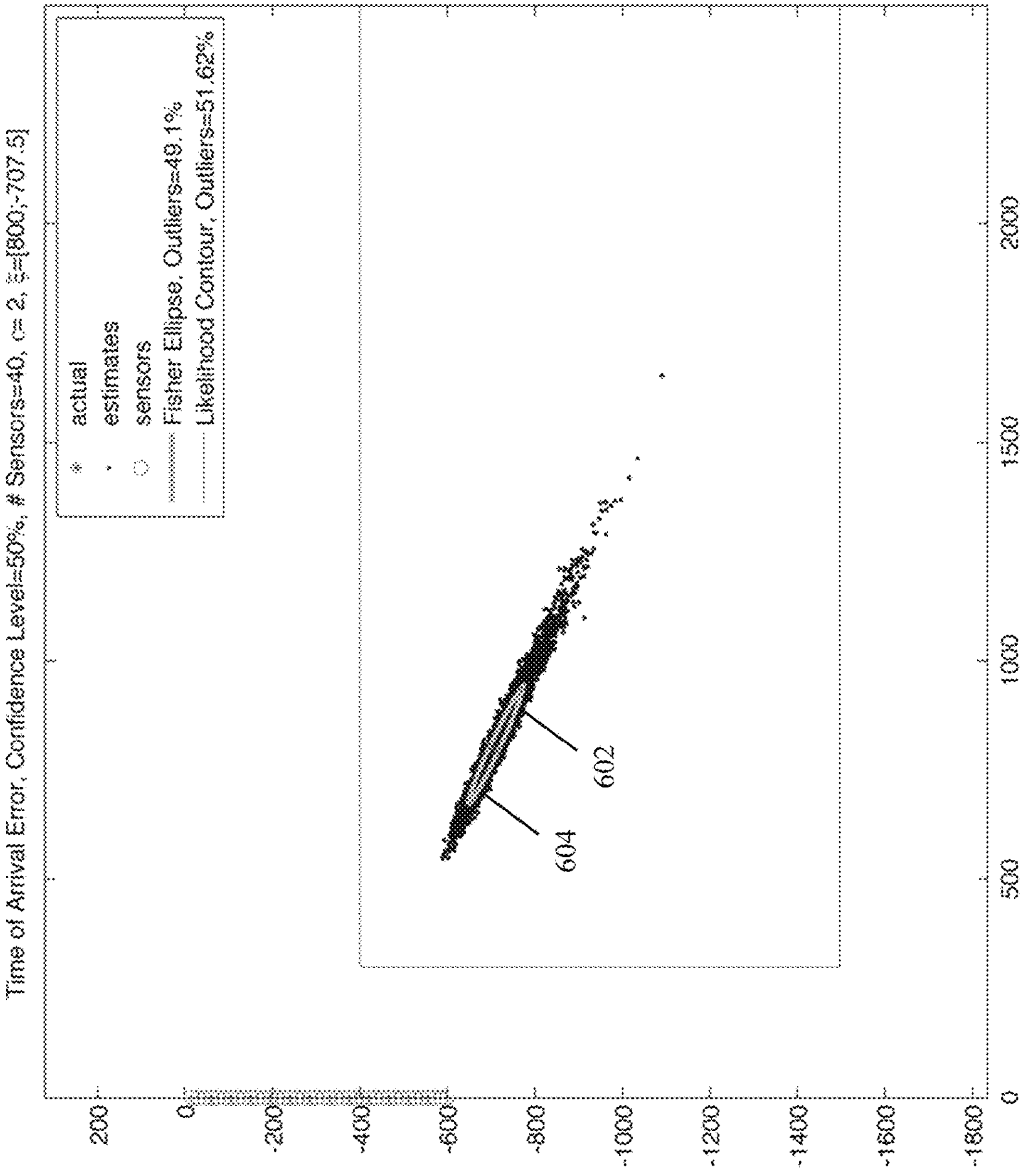
FIG. 6 illustrates the results of a Monte Carlo simulation as in FIG. 4 with both a Fisher ellipse and a contour of the likelihood function that correspond to a 50% confidence level plotted according to embodiments of the invention.

For example, FIG. 6 illustrates the results of a Monte Carlo simulation as in FIG. 4, where only P-wave arrival times have been used in the event location estimates; such P-wave only localization techniques will be known to those skilled in the art. Both a Fisher ellipse 602 and a contour 604 of the likelihood function that correspond to a 50% confidence level are plotted; it can be seen that they are similar but not exactly the same, as the errors are fairly large at that confidence level. The actual percentages of location estimates that landed outside of these two regions are reported in the legend 606. Both the Fisher ellipse and the likelihood contour accurately predict the location, shape, and size of the confidence interval and agree with the results of the simulation.

Figure 7:
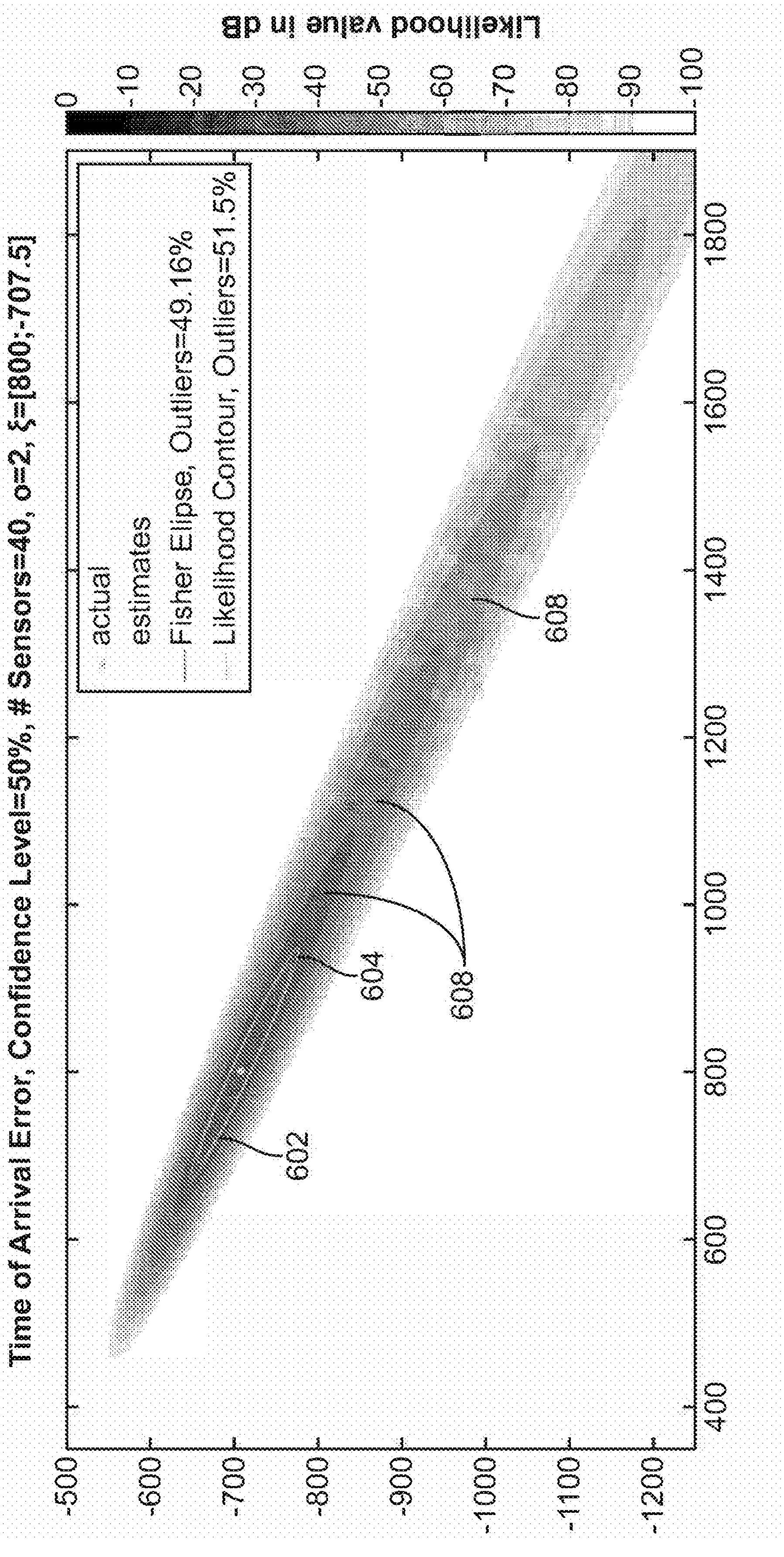
FIG. 7 is a close-up of the location estimates depicted in FIG. 6, with various values of likelihood displayed in the background as associated different colors according to embodiments of the invention.

FIG. 7 is a close-up of the location estimates depicted in FIG. 6, with various values of likelihood displayed in the background as associated different colors 608. The same 50% confidence curves 602 and 604 depicted in FIG. 6 are displayed again here.

Figure 8:
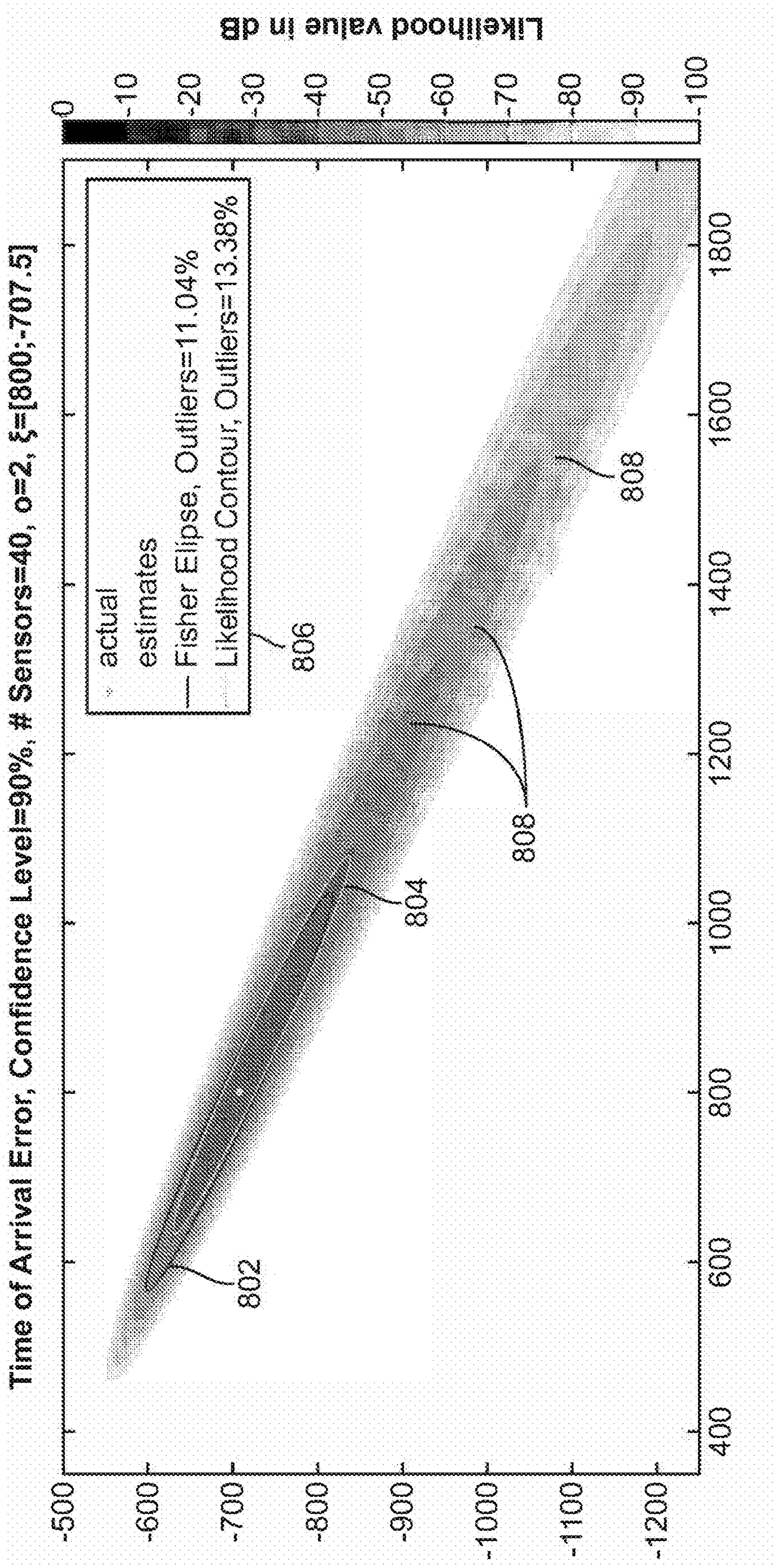
FIG. 8 is a close-up of the location estimates depicted in FIG. 6 and FIG. 7, along with the likelihood function in the background as colors, with 90% confidence curves depicted both in the form of a Fisher ellipse and a likelihood function contour according to embodiments of the invention.

FIG. 8 is a close-up of the location estimates depicted in FIG. 6 and FIG. 7, along with the likelihood function in the background as colors 808, with 90% confidence curves depicted both in the form of a Fisher ellipse 802 and a likelihood function contour 804. The actual percentages of location estimates that landed outside of these two regions are again reported in the legend 806, and reflect a close agreement between the simulation results and the confidence regions predicted by the ellipse and likelihood contour. The disagreement between the Fisher ellipse and likelihood contour regions is more apparent here than in FIG. 7 because the higher confidence curves include estimates with fairly large error and thus extend beyond the small-error region where the linear error characterization provided by the Fisher ellipse may be less accurate.

Figure 9:
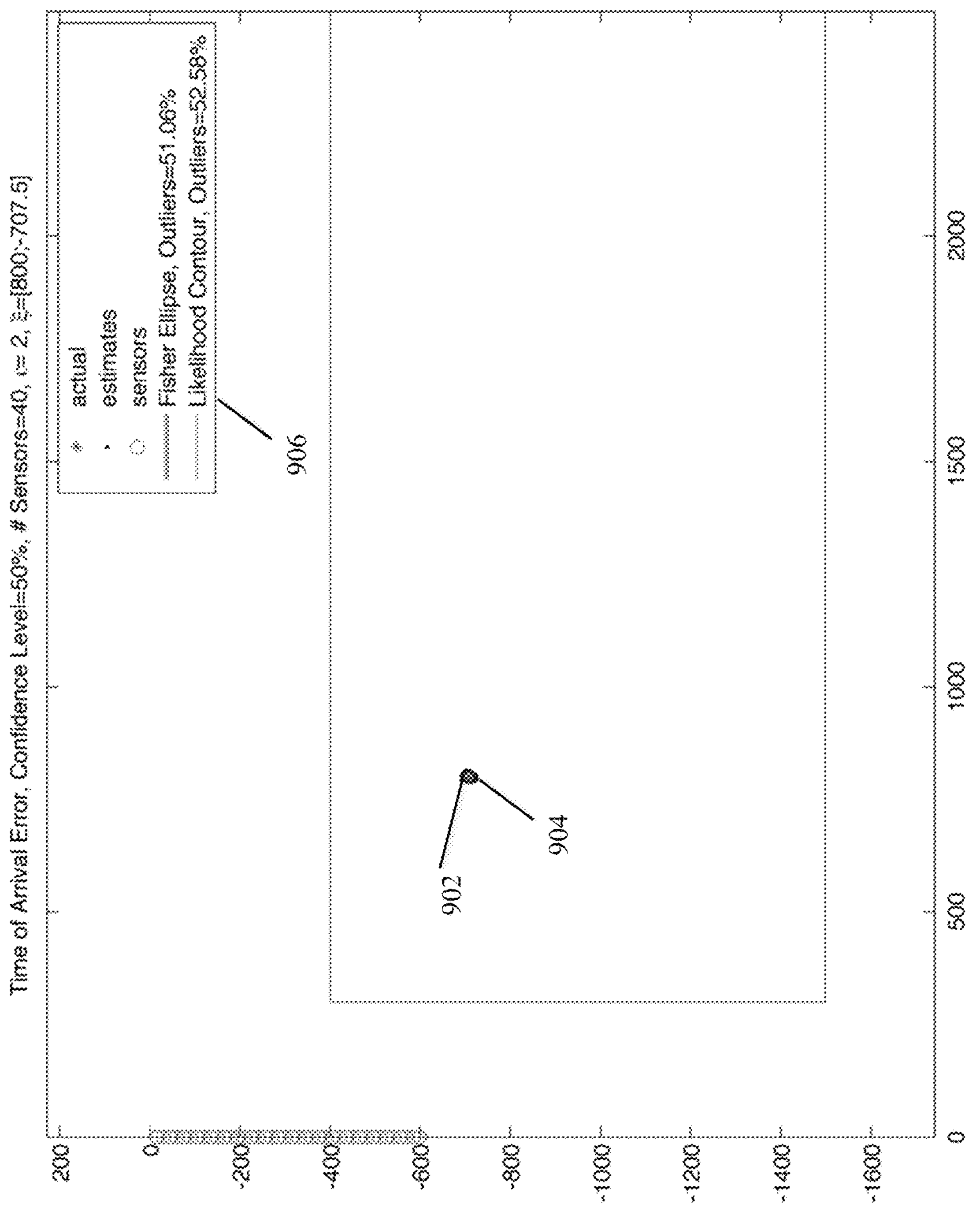
FIG. 9 illustrates the results of a Monte Carlo simulation as in FIG. 4, where both P-wave and S-wave arrival times have been used simultaneously in the event location estimates made using the maximum likelihood estimator, with both a Fisher ellipse and a contour of the likelihood function that correspond to a 50% confidence level plotted according to embodiments of the invention.

FIG. 9 illustrates the results of a Monte Carlo simulation as in FIG. 4, where both P-wave and S-wave arrival times have been used simultaneously in the event location estimates made using the maximum likelihood estimator described previously. Both a Fisher ellipse 902 and a contour 904 of the likelihood function that correspond to a 50% confidence level are plotted, although they are both quite small and may be difficult to see. The actual percentages of location estimates that landed outside of these two regions are reported in the legend 906. Both the Fisher ellipse and the likelihood contour accurately predict the location, shape, and size of the confidence interval and agree with the results of the simulation.

Figure 10:
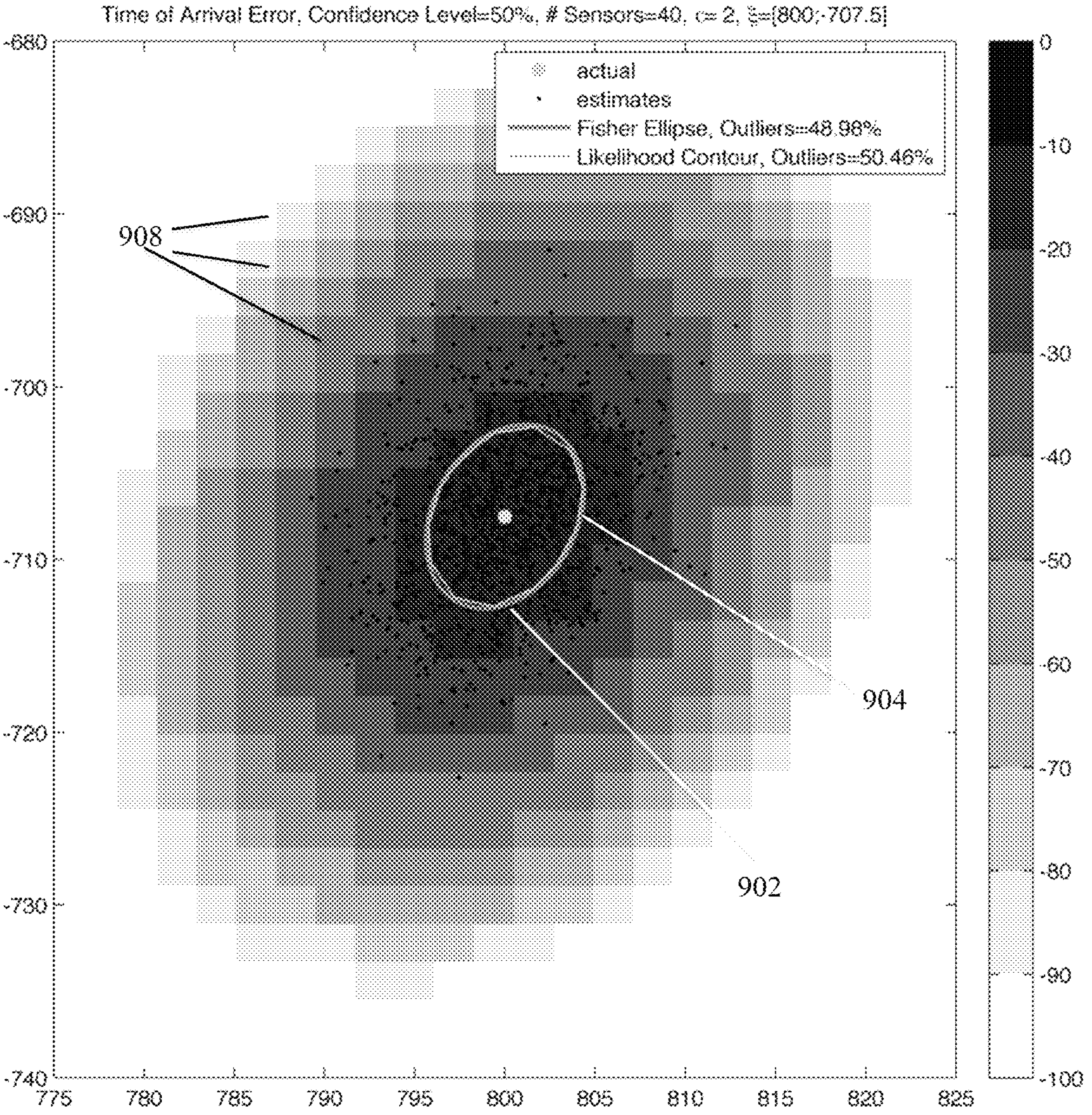
FIG. 10 is a close-up of the location estimates depicted in FIG. 9, with various values of likelihood displayed in the background as associated various colors according to embodiments of the invention.

FIG. 10 is a close-up of the location estimates depicted in FIG. 9, with various values of likelihood displayed in the background as associated various colors 908. The same 50% confidence curves 902, 904 depicted in FIG. 9 are displayed again here. Because the localization errors are small in this case and both curves fall within the small-error region, the Fisher ellipse and likelihood contour are very similar.

Figure 11:
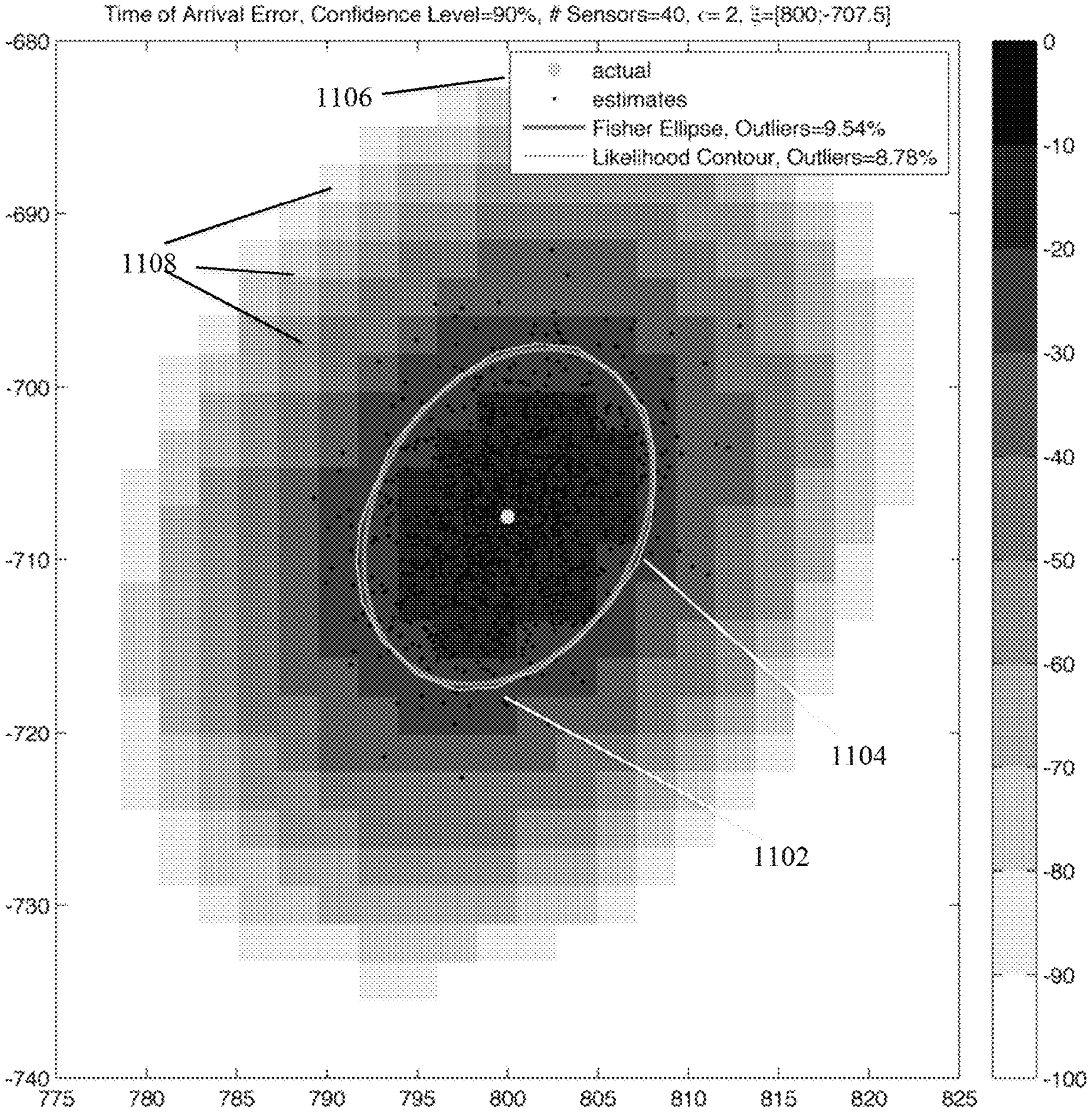
FIG. 11 is a close-up of the location estimates depicted in FIG. 9 and FIG. 10, along with various values of the likelihood function in the background as associated various colors and 90% confidence curves depicted both in the form of a Fisher ellipse and a likelihood function contour according to embodiments of the invention.
Figure 12A:
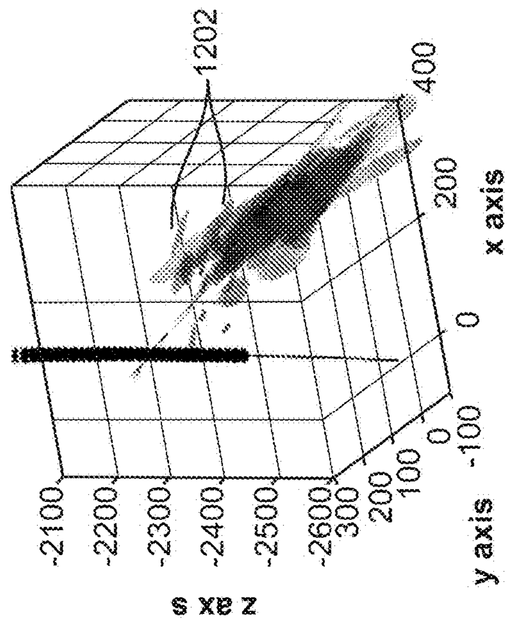
FIG. 12A, FIG. 12B, FIG. 12C and FIG. 12D illustrate multiple views of event localizations according to embodiments of the invention, where uncertainty information has been incorporated into the display by displaying an ellipsoid for each event.
Figure 12B:
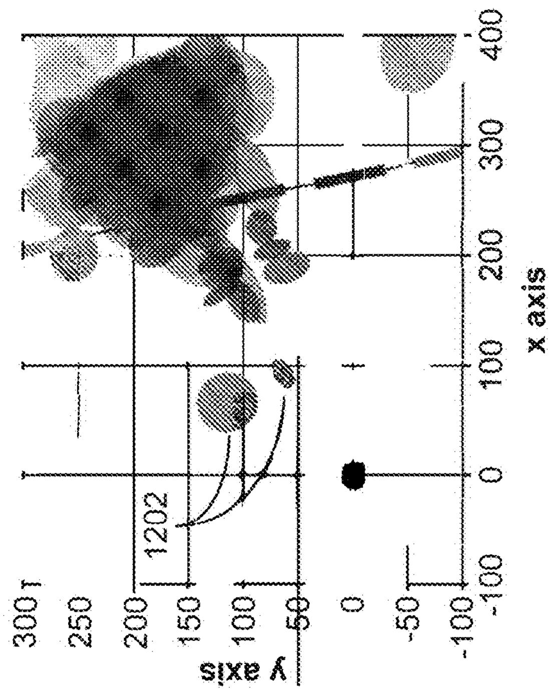
Figure 12C:
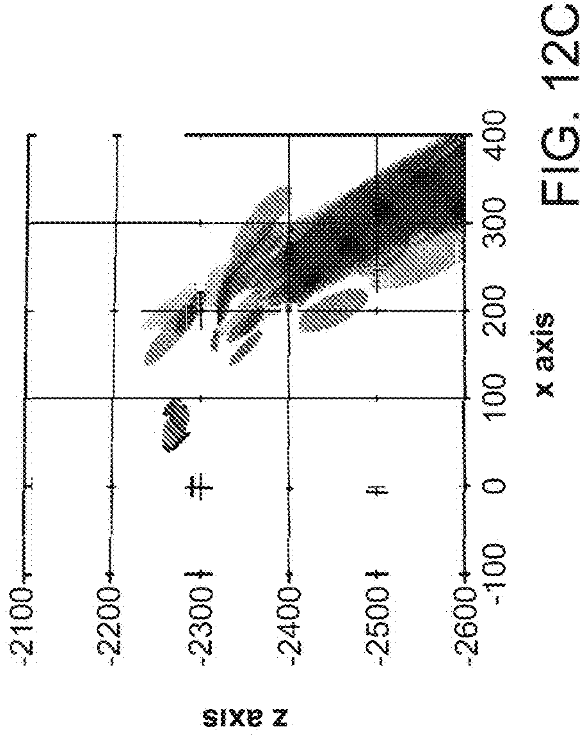
Figure 12D:
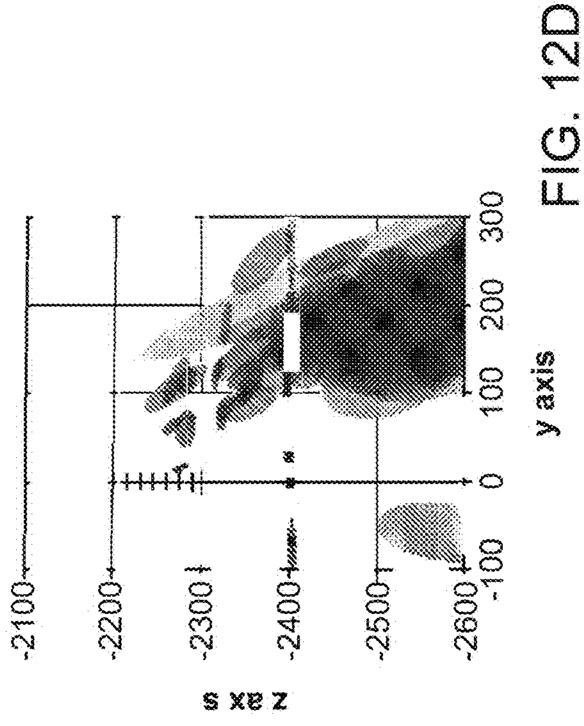
Figure 13A:
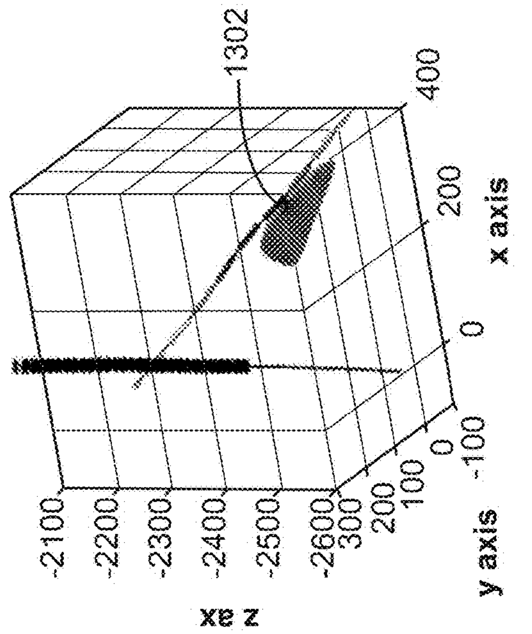
FIG. 13A, FIG. 13B, FIG. 13C and FIG. 13D illustrate multiple views of the surface defining the boundary of the 20% confidence volume for the P-wave only localizations depicted in FIG. 2 according to embodiment of the invention.
Figure 13B:
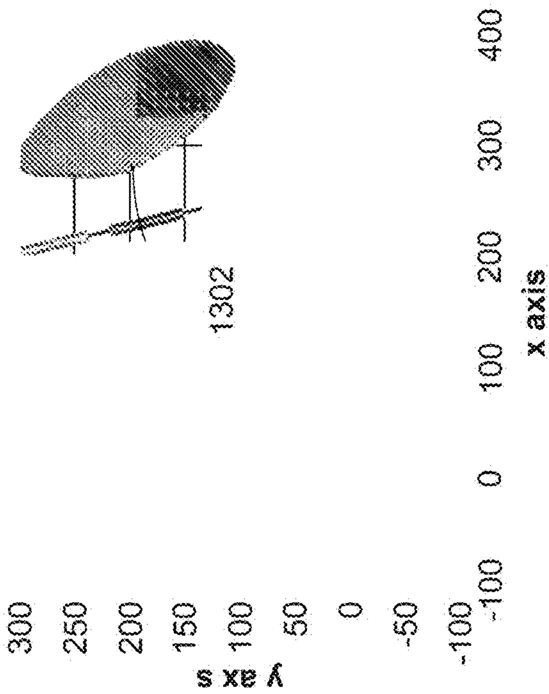
Figure 13C:
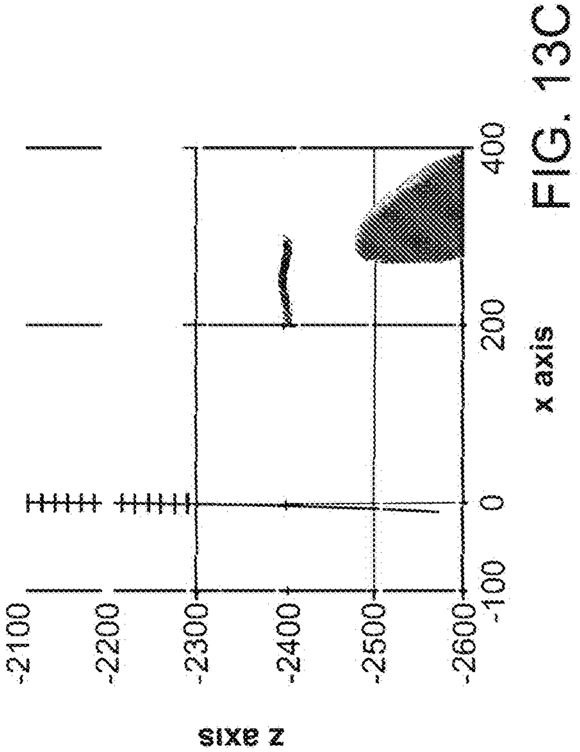
Figure 13D:
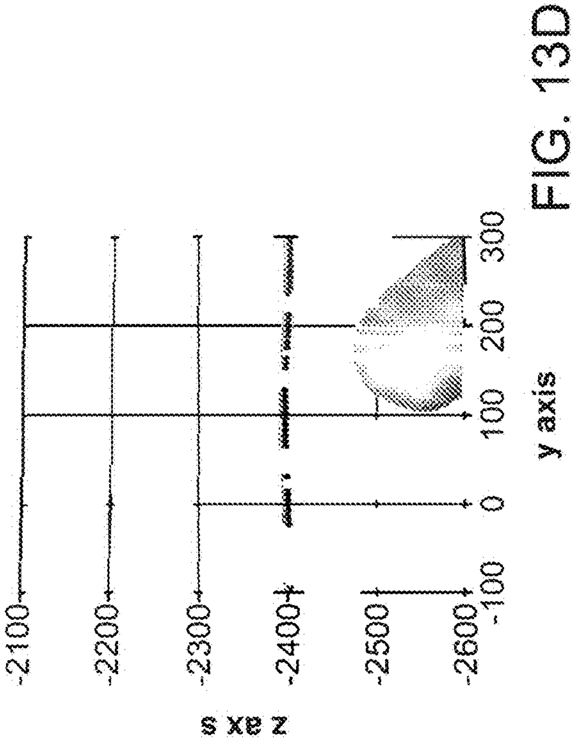
Figure 14A:
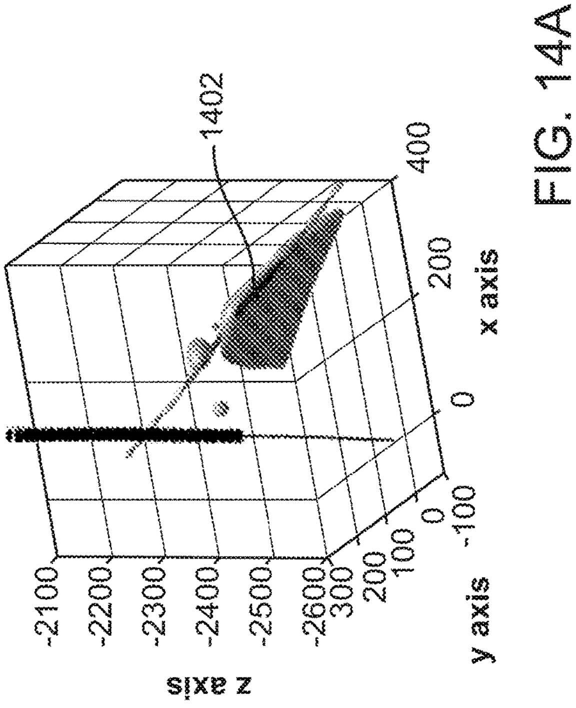
FIG. 14A, FIG. 14B, FIG. 14,C and FIG. 14D illustrate multiple views of the surface defining the boundary of the 50% confidence volume for the P-wave only localizations depicted in FIG. 2 according to embodiments of the invention.
Figure 14B:
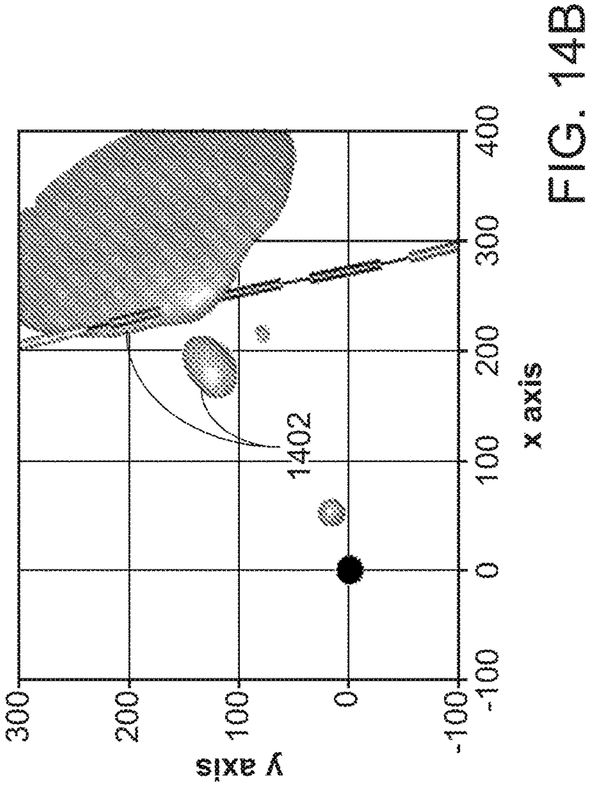
Figure 14C:
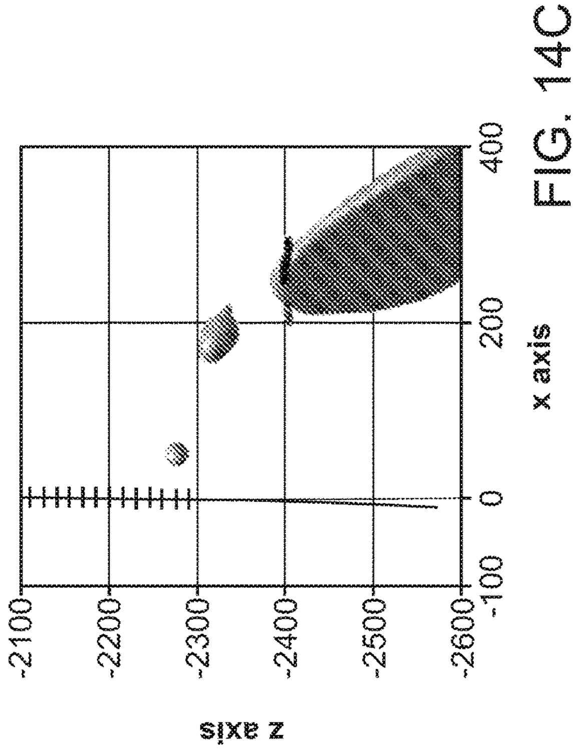
Figure 14D:
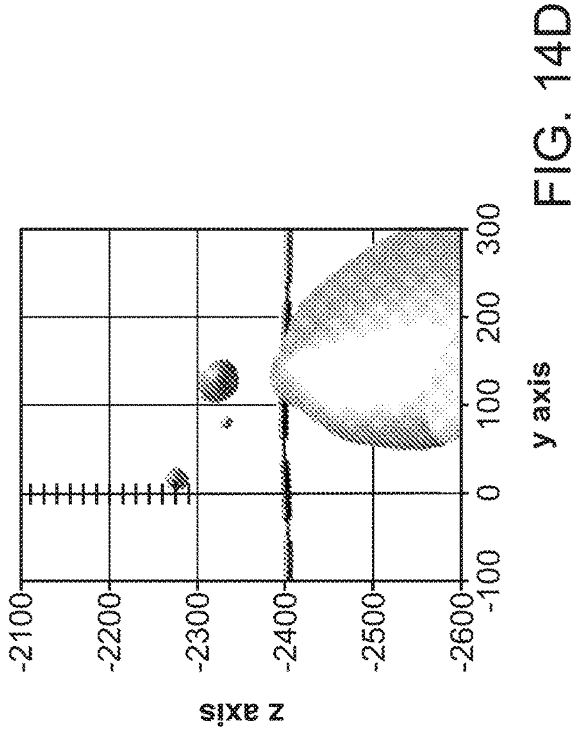
Figures 15A, 15B, 15C, 15D:
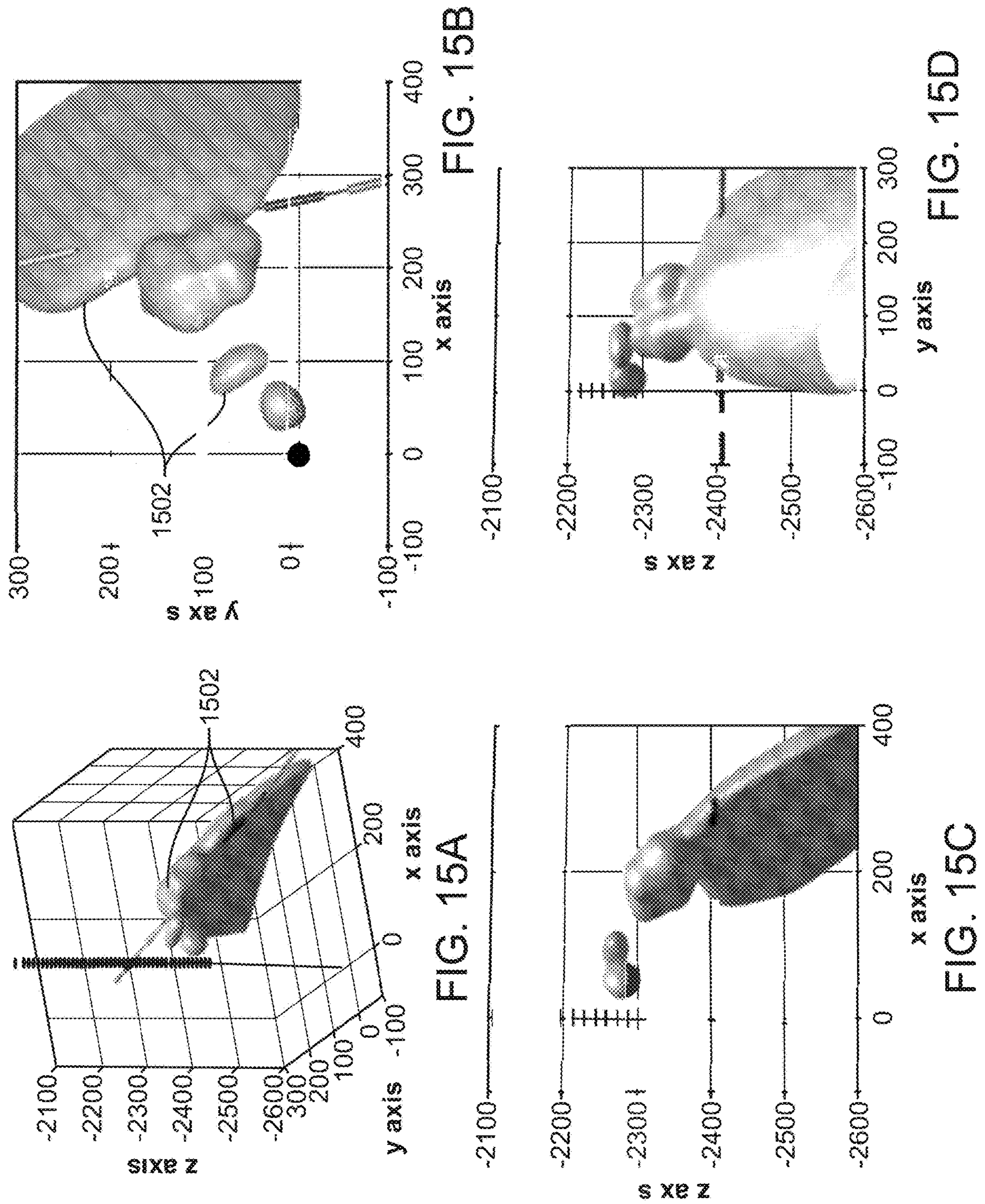
FIG. 15A, FIG. 15B, FIG. 15C and FIG. 15D illustrate multiple views of the surface defining the boundary of the 90% confidence volume 1502 for the P-wave only localizations depicted in FIG. 2 according to embodiments of the invention.
Figure 16A:
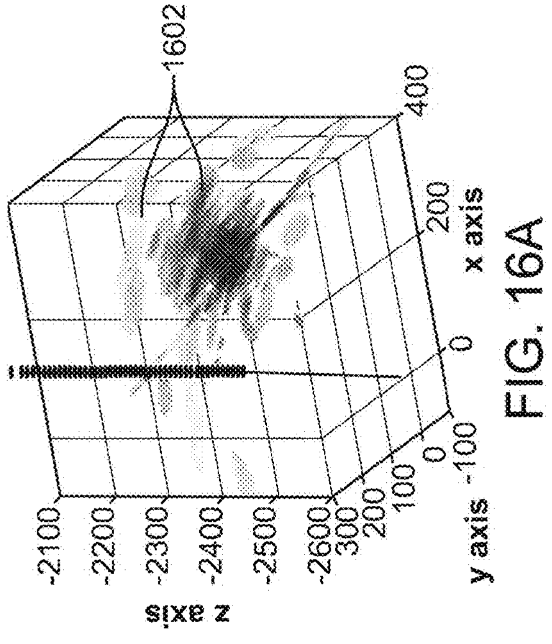
FIG. 16A, FIG. 16B, FIG. 16C and FIG. 16D illustrate multiple views of the event localizations depicted in FIG. 3, where uncertainty information according to aspects of the invention has been incorporated into the display by displaying an ellipsoid for each event.
Figure 16B:
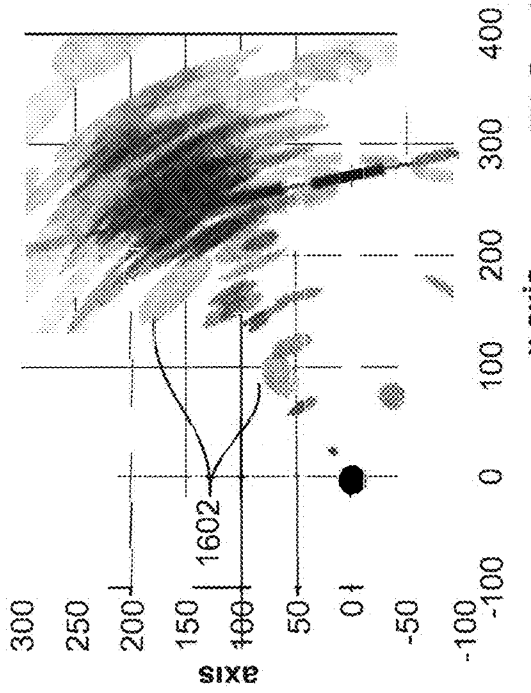
Figure 16C:
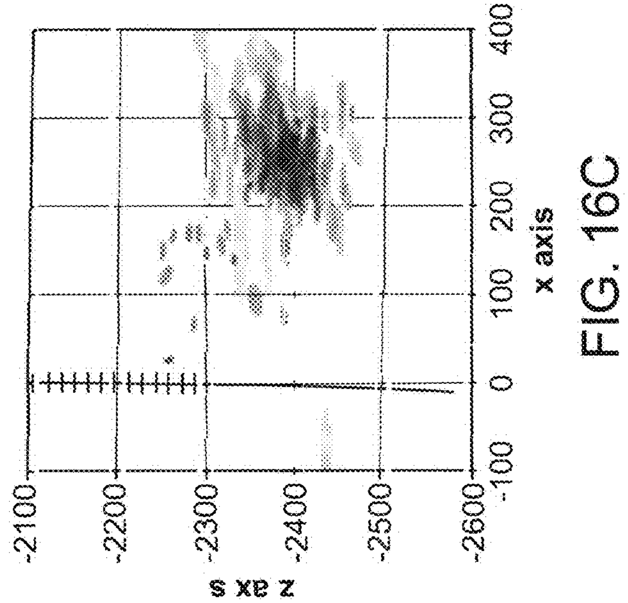
Figure 16D:
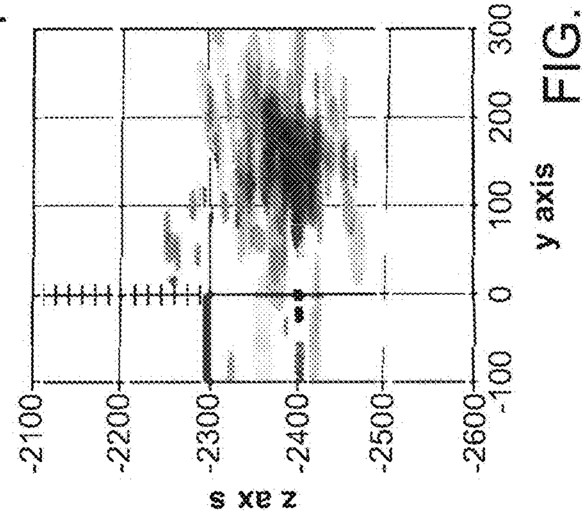
Figure 17B:
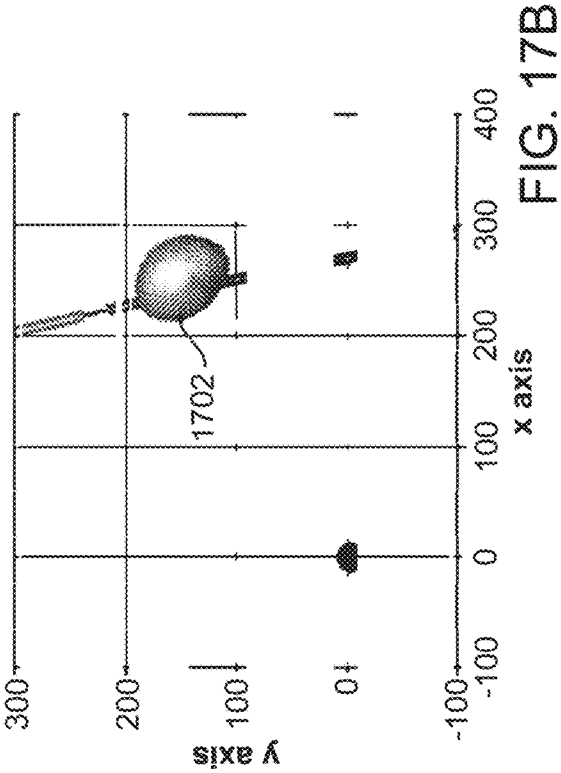
FIG. 17A, FIG. 17B, FIG. 17C and FIG. 17D illustrate multiple views of the surface defining the boundary of the 20% confidence volume for the localizations made using both P-waves and S-waves depicted in FIG. 3 according to embodiments of the invention.
Figure 17A:
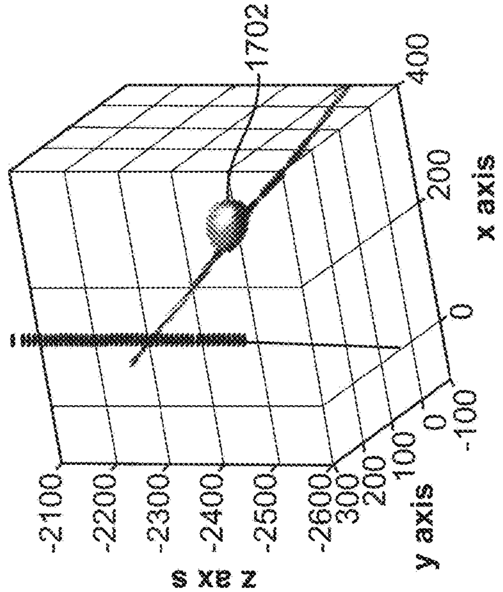
Figure 17D:
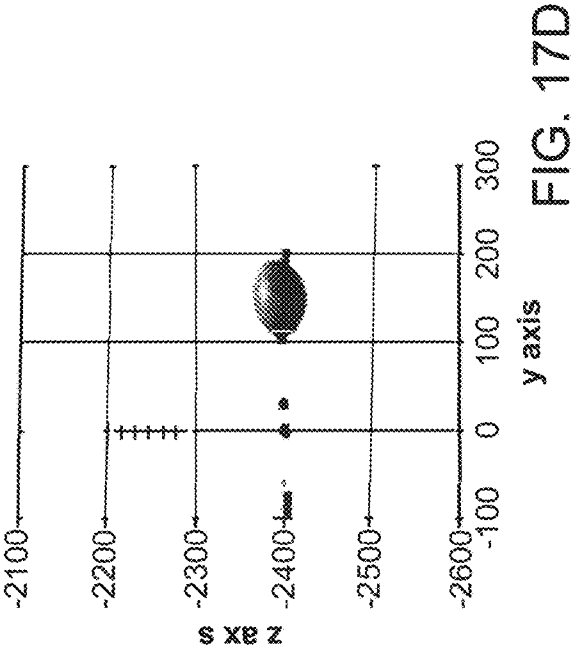
Figure 17C:
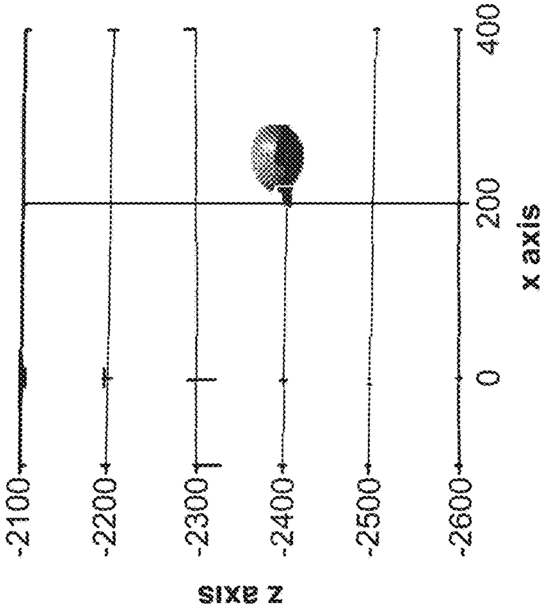
Figure 18A:
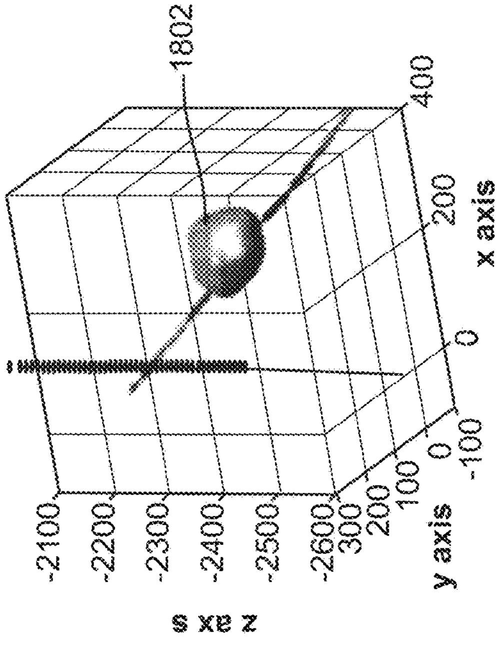
FIG. 18A, FIG. 18B, FIG. 18C and to FIG. 18D illustrate multiple views of the surface defining the boundary of the 50% confidence volume for the localizations made using both P-waves and S-waves depicted in FIG. 3 according to embodiments of the invention.
Figure 18B:
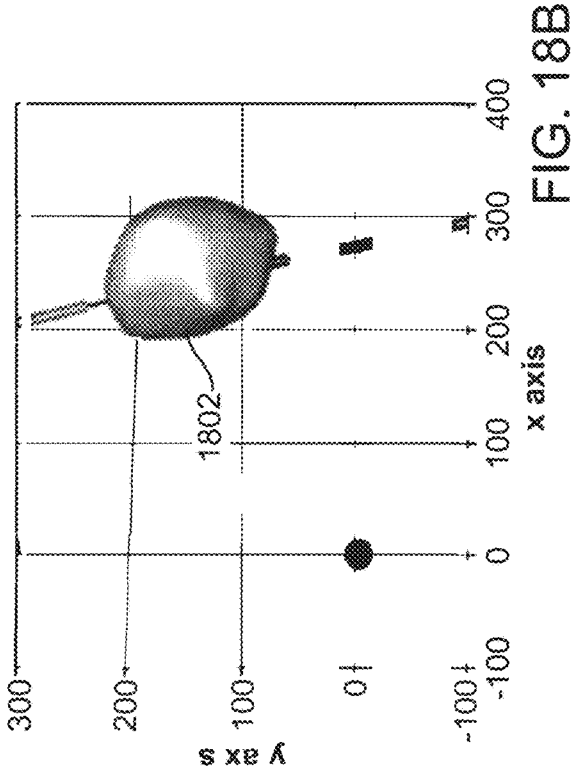
Figure 18C:
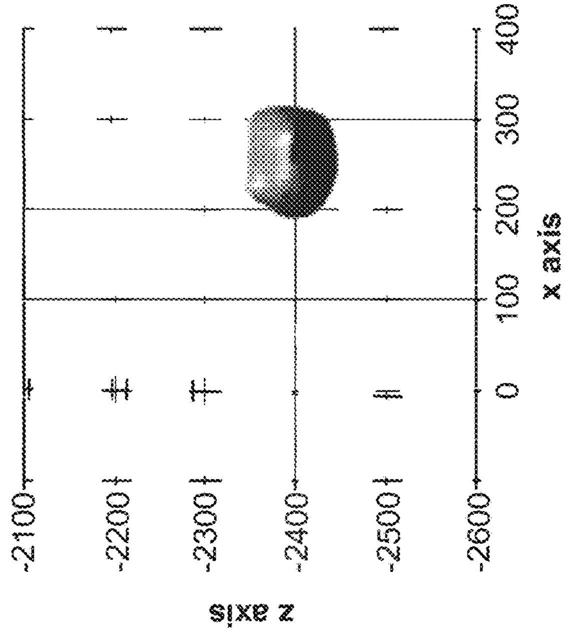
Figure 18D:
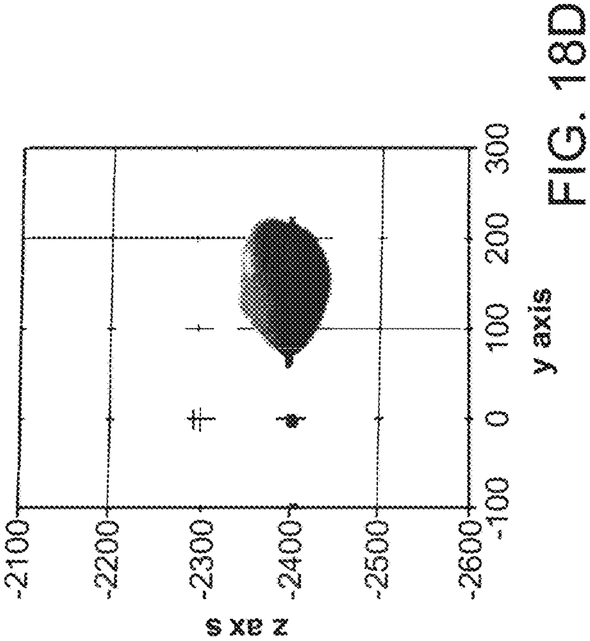
Figure 19B:
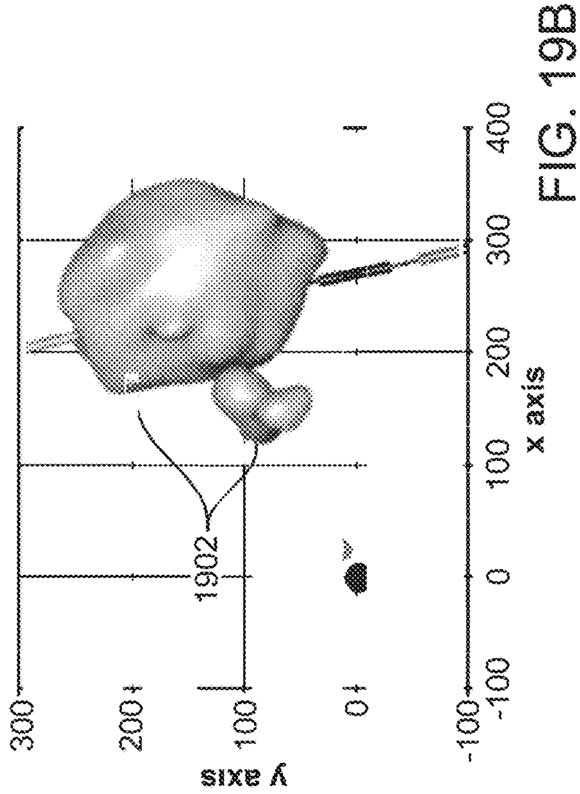
FIG. 19A, FIG. 19B, FIGS. 19C and 19D illustrate multiple views of the surface defining the boundary of the 90% confidence volume for the localizations made using both P-waves and S-waves depicted in FIG. 3 according to embodiments of the invention.
Figure 19A:
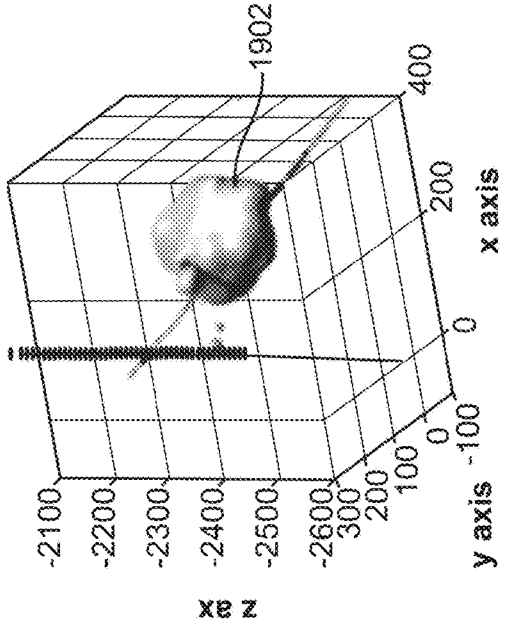
Figure 19D:
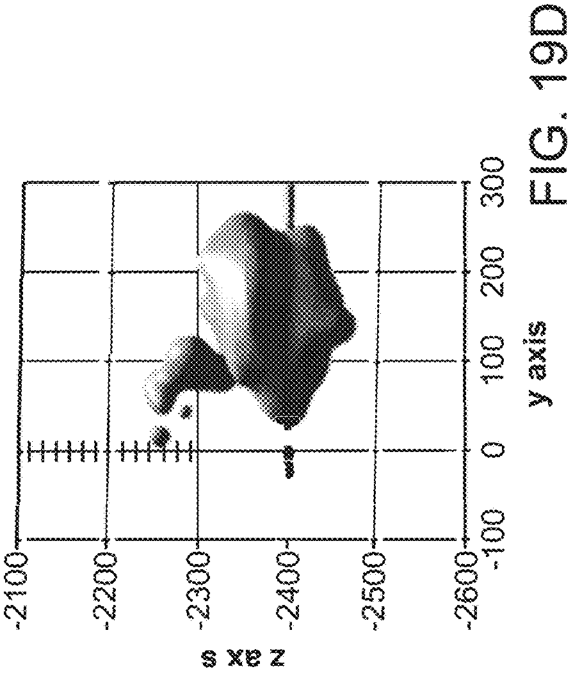
Figure 19C:
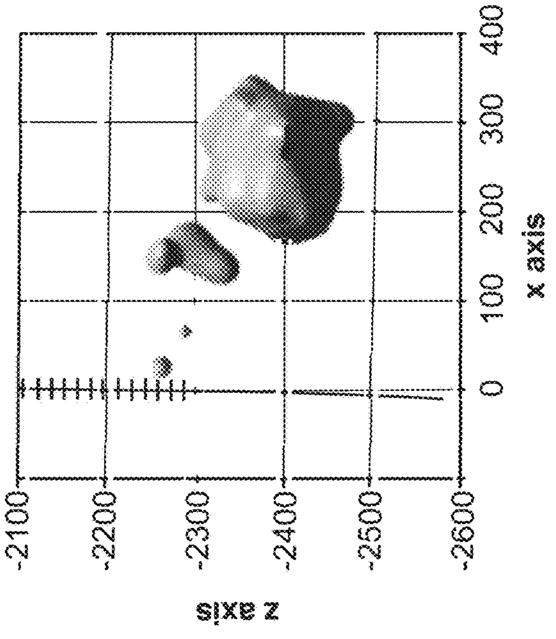

FIG. 11 is a close-up of the location estimates depicted in FIG. 9 and FIG. 10, along with various values of the likelihood function in the background as associated various colors 1108, with 90% confidence curves depicted both in the form of a Fisher ellipse 1102 and a likelihood function contour 1104. The actual percentages of location estimates that landed outside of these two regions are again reported in the legend 1106, and reflect a close agreement between the simulation results and the confidence regions predicted by the ellipse and likelihood contour. Localization errors remain small and thus the Fisher ellipse and likelihood contours are again very similar.

In contrast to FIG. 2, FIGS. 12A to 12D illustrate multiple views of event localizations according to embodiments of the invention, where uncertainty information has been incorporated into the display by displaying an ellipsoid 1202 for each event shown in FIG. 2 rather than a sphere, where the size and shape of the ellipsoid depict the spatial distribution of location error for that event as well as the accuracy with which it could have been located given properties of the recorded data, local propagation medium, and monitoring geometry, and the decision to perform P-wave-only localization. The opacity of the ellipsoids reflects the relative accuracy of the localizations: events that have been localized with high accuracy appear as small opaque ellipsoids, while events that have been localized with low accuracy appear as large transparent ellipsoids. For example, the small opaque ellipsoids near the monitor well indicate that the associated events were accurately located, despite being placed away from the majority of other events. In some cases, it may be beneficial to place a lower limit on the size of ellipsoids displayed for events that have been localized with very high accuracy so that they may remain visible.

FIGS. 13A to 13D illustrate multiple views of the surface defining the boundary of the 20% confidence volume 1302 for the P-wave only localizations depicted in FIG. 2. Using the voxel techniques according to embodiments of the invention described above, this volume is the smallest volume that is expected to contain 20% of the microseismic activity that occurred during the treatment stage depicted in FIG. 2, when the localization uncertainty associated with each event is taken into account, and provides an aggregate assessment of the most-stimulated regions. The present inventors recognize that traditional methods of calculating a similar metric will be known to those skilled in the art and typically involve wrapping forming the convex hull of all estimated event locations and then tuning some parameter or threshold to determine which events to exclude from the set defining that hull such that a smaller volume is arrived at that contains most of the estimated event locations, disregarding some number of "outliers". These traditional methods may yield poor assessments of the stimulated region because they do not consider localization uncertainty and may exclude accurately localized events as "outliers" while simultaneously allowing the shape of the volume to be dictated by events that were not accurately localized.

FIGS. 14A to 14D illustrate multiple views of the surface defining the boundary of the 50% confidence volume 1402 for the P-wave only localizations depicted in FIG. 2. Using the voxel techniques according to embodiments of the invention described above, this volume is the smallest volume that is expected to contain 50% of the microseismic activity that occurred during the treatment stage depicted in FIG. 2, when the localization uncertainty associated with each event is taken into account, and provides an aggregate assessment of the regions that received a fair amount of stimulation during the current treatment stage.

FIGS. 15A to 15D illustrate multiple views of the surface defining the boundary of the 90% confidence volume 1502 for the P-wave only localizations depicted in FIG. 2. Using the voxel techniques according to embodiments of the invention described above, this volume is the smallest volume that is expected to contain 90% of the microseismic activity that occurred during the treatment stage depicted in FIG. 2, when the localization uncertainty associated with each event is taken into account, and provides an aggregate assessment of the regions that were stimulated during the current treatment stage. In some cases it will be beneficial to have interactive control over the confidence level dictating the displayed volume so that a user can interactively move through displays such as depicted in FIGS. 13, 14, and 15. Similarly, it may be beneficial to have interactive control of the confidence interval displayed by a set of error ellipsoids or likelihood contours, such as those depicted in FIG. 11, 12, or 16.

Figure 3:
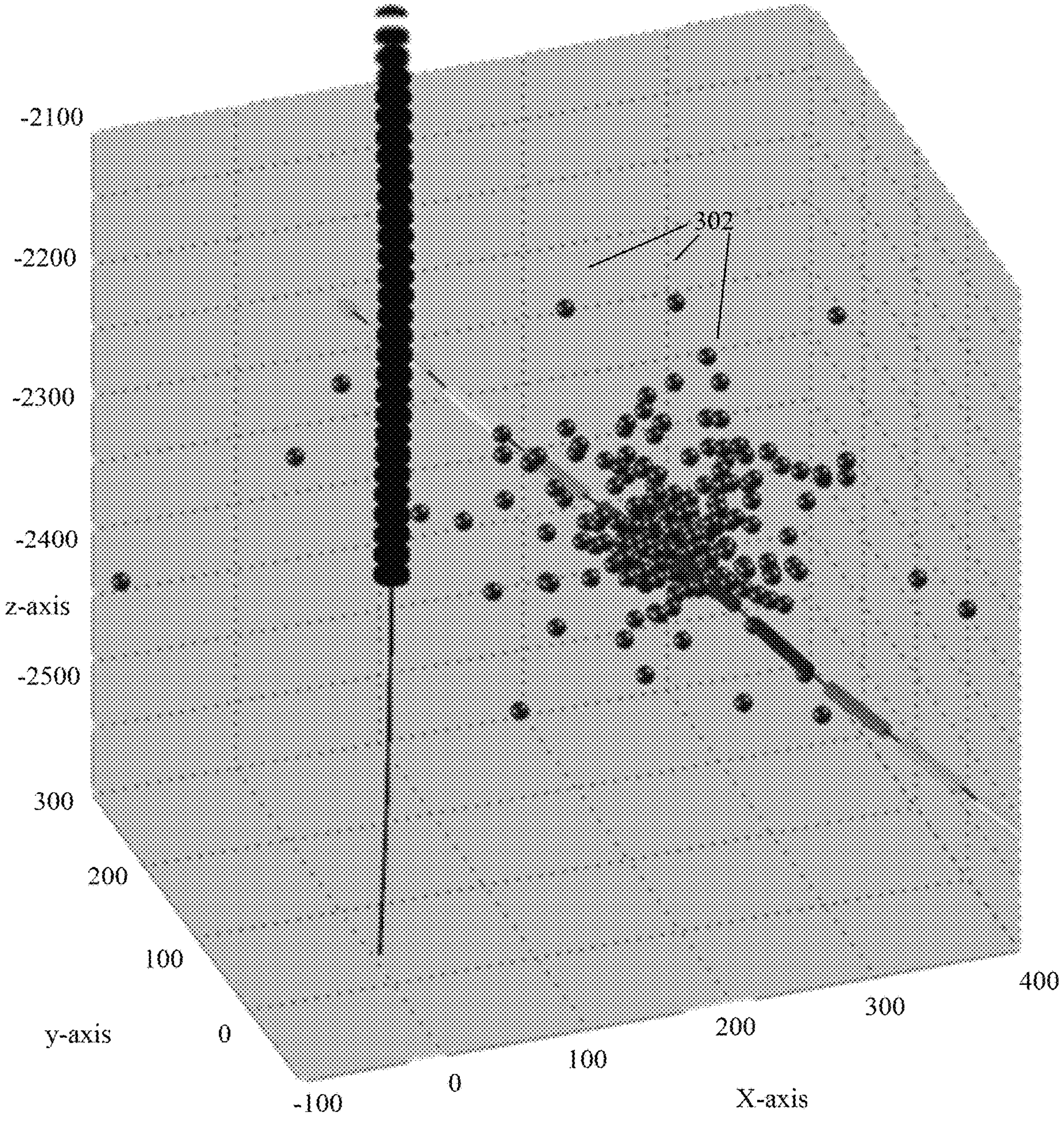
FIG. 3 is an example display of microseismic event location estimates using P-wave and S-wave information.

Similar to FIGS. 12 to 15, and in contrast to FIG. 3, FIGS. 16A to 16D illustrate multiple views of the event localizations depicted in FIG. 3, where uncertainty information according to aspects of the invention has been incorporated into the display by displaying an ellipsoid 1602 for each event rather than a sphere, where the size and shape of the ellipsoid depict the spatial distribution of location error for that event as well as the accuracy with which it could been located given properties of the recorded data, local propagation medium, and monitoring geometry, and the decision to use both P-wave and S-wave arrival time information during localization. The opacity of the ellipsoids reflects the relative accuracy of the localizations: events that have been localized with high accuracy appear as small opaque ellipsoids, while events that have been localized with low accuracy appear as large transparent ellipsoids. The different amounts of localization accuracy provided by localization techniques using only P-wave or both P and S-wave information is evident in the shapes and sizes of the ellipsoids displayed here and in FIG. 12: using both P and S-wave arrival information provides greatly superior range and depth accuracy than using P-wave arrival information alone. This trend mimics the relationship seen in the simulations in FIGS. 6 and 9, although localization is reduced to a 2-dimensional plane in those figures. Note that this difference in the amount and spatial distribution of localization uncertainty is not evident when comparing FIGS. 2 and 15, where event locations are displayed in the traditional way, as spheres.

FIGS. 17A to 17D illustrate multiple views of the surface defining the boundary of the 20% confidence volume 1702 for the localizations made using both P-waves and S-waves depicted in FIG. 3. Using the voxel techniques according to embodiments of the invention described above, this volume is the smallest volume that is expected to contain 20% of the microseismic activity that occurred during the treatment stage depicted in FIG. 3, when the localization uncertainty associated with each event is taken into account, and provides an aggregate assessment of the most-stimulated regions during the current treatment stage.

FIGS. 18A to 18D illustrate multiple views of the surface defining the boundary of the 50% confidence volume 1802 for the localizations made using both P-waves and S-waves depicted in FIG. 3. Using the voxel techniques according to embodiments of the invention described above, this volume is the smallest volume that is expected to contain 50% of the microseismic activity that occurred during the treatment stage depicted in FIG. 3, when the localization uncertainty associated with each event is taken into account, and provides an aggregate assessment of the regions that received a fair amount of stimulation during the current treatment stage.

FIGS. 19A to 19D illustrate multiple views of the surface defining the boundary of the 90% confidence volume 1902 for the localizations made using both P-waves and S-waves depicted in FIG. 3. Using the voxel techniques according to embodiments of the invention described above, this volume is the smallest volume that is expected to contain 90% of the microseismic activity that occurred during the treatment stage depicted in FIG. 3, when the localization uncertainty associated with each event is taken into account, and provides an aggregate assessment of the regions that were stimulated during the current treatment stage.

Taken together, these figures illustrate the importance of determining and displaying uncertainty information when interpreting the results of microseismic event localization according to embodiments of the invention. For example, the higher uncertainty for P-wave only localization that is evident in FIGS. 12A to 12D causes the estimated event locations to be spread along a predominant direction of uncertainty, similar to the simulation results in FIG. 6. This trend in the event locations remains evident when the locations are plotted traditionally as spheres (e.g. FIG. 2), and if one does not know that this trend is the result of uncertainty inherent in the localization process, it may be mistakenly interpreted as fracture network structure and extension, leading to improper assessment of the results of the hydraulic-fracture treatment that is likely to impact future well placement and treatment procedures as well as production projections.

Figure 20:
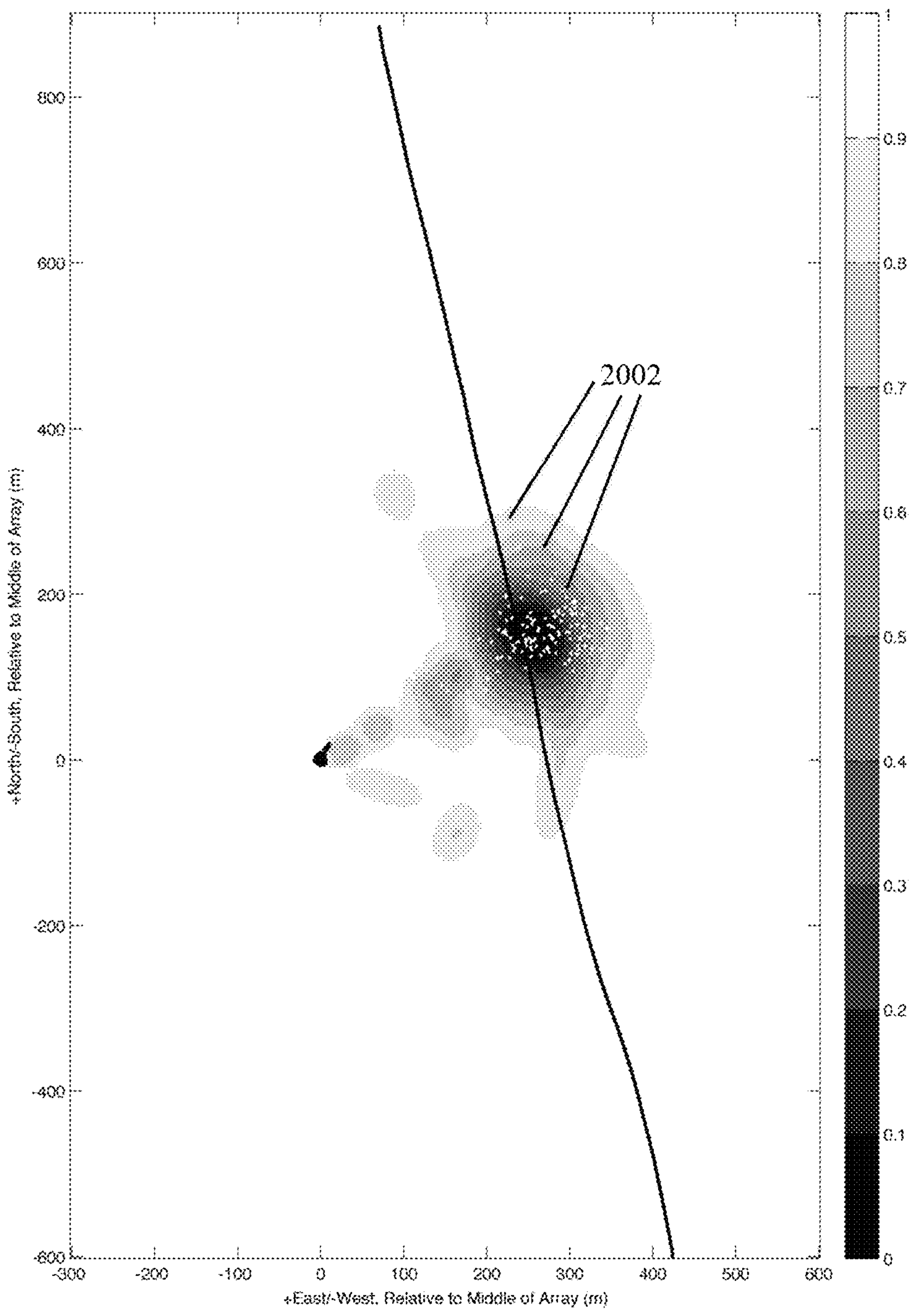
FIG. 20 illustrates a comparison of event localization results using two different localization algorithms through location uncertainty analysis and the construction of the 3-dimensional (voxel-based) stimulation probability metric that has been projected down to a 2-dimensional map view.

FIG. 20 illustrates a comparison of event localization results using two different localization algorithms through location uncertainty analysis and the construction of the 3-dimensional (voxel-based) stimulation probability metric that has been projected here down to a 2-dimensional map view using the inventive method described above in which the probability volume voxel probability values are summed along the projected dimension to form the displayed 2-dimensional metric. The location estimates made using one localization technique and their associated uncertainties were used to form an aggregate measure of the probability that an event occurred within each voxel sub-division of the local region. The confidence values 2002 associated with this metric are displayed here, projected down to a map-view plane using techniques described above, and the event location estimates made using the alternate localization technique are displayed as white dots on top of this surface. If both localization techniques are performing well, this probability metric will be very similar for the two results, although individual event location estimates are not necessarily expected to be the same across both localization techniques. If this probability metric is substantially different for the two sets of localizations it can be concluded that either underlying assumptions (velocity model, etc.) or aspects of the techniques themselves (for example, what information from the recorded data is being utilized in localization) must be different. In this way, the probabilistic interpretation of event localization can be used to account for the variance in individual event location estimates that is expected because of contaminating noise present in the data in order to compare various localization results for a given data set.

Additional or alternative embodiments consider the case of a distributed acoustic sensor (DAS) sampling seismic energy at points along an observation well that deviates little from a line at a given vertical depth. In this case, while an event might be well localized in measured depth along the sensor array and range from the sensor array, the vertical depth (more precisely, the angle about the array) will be poorly known in the absence of other information. In this scenario, it is often useful to produce two-dimensional event location and location uncertainty estimates.

Such location estimates may be found by restricting the locations considered to the vertical depth of the treatment stage, and evaluating the likelihood (or other goodness of fit measure) at a two-dimensional grid of points—pixels rather than voxels—at that vertical depth. Similarly, a two-dimensional event location estimate (e.g., in distance along the array and range from the array) may be formed by evaluating the likelihood at points on a set of cylindrical coordinates centered on the axis of the sensor array. The two dimensions of the (interpolated) three-dimensional point that maximizes the goodness of fit is the two-dimensional position estimate. In another alternative, localizations may be formed in a volume containing the plane of the treatment well, and spanning a given vertical depth region, say that of the treatment layer. The resulting localizations may be projected onto two dimensions, e.g., in the plane at the vertical depth of the treatment stage.

An additional alternative for estimating the event location is to form a plane of positions that contains the axis of the array, and the mean stage perf shot positions. Using sensor positions projected onto the plane, travel time tables are generated for hypothesized positions on the plane. The travel time tables are then used to estimate event positions by maximizing the likelihood or other goodness of fit to the measured travel times.

To form and display aspects of the two-dimensional event location estimate uncertainty, such as error ellipses, the techniques described above may be used. No modification is needed if the estimate formed by optimizing a likelihood or other goodness of fit measure in two dimensions. If, however, the estimate is formed using a three-dimensional computation, and the resulting location projected onto two dimensions, then the error ellipsoids, Fisher information or inverse variances, and other aspects of uncertainty should be similarly projected to form their two-dimensional counterparts. Likewise, if a three-dimensional event location is formed, and one of the dimensions, e.g., vertical depth, is discarded, then that dimension of the aspect of the event location uncertainty should be discarded to form the corresponding two-dimensional quantity.

The herein described subject matter sometimes illustrates different components contained within, or connected with, different other components. It is to be understood that such depicted architectures are illustrative, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably coupleable," to each other to achieve the desired functionality. Specific examples of operably coupleable include but are not limited to physically mateable and/or physically interacting components and/or wirelessly interactable and/or wirelessly interacting components and/or logically interacting and/or logically interactable components.

With respect to the use of plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Further, unless otherwise noted, the use of the words "approximate," "about," "around," "substantially," etc., mean plus or minus ten percent.

Although the present embodiments have been particularly described with reference to preferred examples thereof, it should be readily apparent to those of ordinary skill in the art that changes and modifications in the form and details may be made without departing from the spirit and scope of the present disclosure. It is intended that the appended claims encompass such changes and modifications.

What is claimed is:

1. A method for displaying microseismic data processing results related to a microseismic event detected at a set of substantially co-linear sensors of a sensor array, the event having an associated event location estimate and a first region of space described by two spatial dimensions, comprising:

forming a statistic describing an aspect of the event location estimate probability as a function of position within the first region; and using the statistic to display an aspect of the estimate probability such that a less accurately localized event would occupy a second region of space having greater size than that of a more accurately localized event.

2. The method of claim 1, wherein the statistic includes a quantity indicating the estimated event location variance along an axis of the space.

3. The method of claim 2, wherein the displayed aspect is an ellipse or ellipsoid centered on the estimated event location, and sized according to the event location variance along the axis.

4. The method of claim 3, wherein the displayed ellipse or ellipsoid has an associated transparency, which is adjusted so that a more accurately localized event is displayed with lesser transparency.

5. The method of claim 1, wherein the forming of the statistic includes computing an inner product of the difference between one set of travel times computed based on a hypothesized event location and another set of travel times.

6. A method for computing aggregate activity statistics based on observations from a substantially co-linear array of sensors in a two-dimensional region of space divided into pixels for a collection of microseismic events, each having an associated event location estimate, comprising:

forming, for each event in the collection, a statistic related to a probability that the event occurred in each of the pixels within the region; and combining the event statistics to form an aggregate probability that an event occurred in each of the pixels.

7. The method of claim 6, further comprising:

identifying a set of pixels that are expected to contain a given portion of the events, the identified set containing among the smallest number of pixels of all of the sets that contain roughly the given portion of events.

8. A method for computing aggregate activity statistics in a region of space divided into voxels or pixels for a collection of microseismic events, each having an associated event location estimate, comprising:

forming, for each event in the collection, a statistic related to a probability that the event occurred in each of the voxels within the region; and combining the event statistics to form an aggregate probability that an event occurred in each of the voxels.

9. The method of claim 8, further comprising:

identifying a set of voxels that are expected to contain a given portion of the events, the identified set containing among the smallest number of voxels of all of the sets that contain roughly the given portion of events.

* * * * *